US012786000B2

(12) United States Patent
Yoo et al.

(10) Patent No.: US 12,786,000 B2

(45) Date of Patent: Nov. 3, 2026

(54) INFORMATION PROCESSING METHOD, PROCESSING SYSTEM, AND PROCESSING APPARATUS FOR A HOME APPLIANCE

(71) Applicant: LG ELECTRONICS INC., Seoul (KR)

(72) Inventors: Hyunsun Yoo, Seoul (KR); Minjeong Kang, Seoul (KR); Kyungin Oh, Seoul (KR); Sukhyun Lim, Seoul (KR); Hyeran Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 236 days.

(21) Appl. No.: 18/725,521

(22) PCT Filed: Sep. 7, 2023

(86) PCT No.: PCT/KR2023/013416

§ 371 (c)(1),
(2) Date: Jan. 17, 2025

(87) PCT Pub. No.: WO2024/080563

PCT Pub. Date: Apr. 18, 2024

(65) Prior Publication Data

US 2025/0150298 A1 May 8, 2025

(30) Foreign Application Priority Data

Oct. 11, 2022 (KR) ........................ 10-2022-0129584

(51) Int. Cl.
*H04L 12/28* (2006.01)

(52) U.S. Cl.
CPC ........ *H04L 12/282* (2013.01); *H04L 12/2807* (2013.01)

(58) Field of Classification Search
None
See application file for complete search history.

(56) References Cited

U.S. PATENT DOCUMENTS

2005/0015458 A1* 1/2005 La ........................ H04L 61/5076 709/208
2013/0166697 A1* 6/2013 Manning ................. H04W 4/60 709/219

(Continued)

FOREIGN PATENT DOCUMENTS

JP 2014-226236 A 12/2014
KR 10-2015-0028175 A 3/2015

(Continued)

*Primary Examiner* — Raqiul A Choudhury

(74) *Attorney, Agent, or Firm* — Birch, Stewart, Kolasch & Birch, LLP

(57) ABSTRACT

An information processing system may include a plurality of home appliances, a terminal configured to process information of the plurality of home appliances, an individual service area configured to provide an individual service, and an information processing apparatus connected to the terminal and the plurality of home appliances through a network and configured to provide an application service using the individual service. The information processing apparatus may be configured to receive basic information including that a user using the plurality of home appliances is going out, confirm a user's schedule information indicating the user is going out from the basic information by using the individual service, confirm a first state of the of the plurality of home appliances, and change a first home appliance of the plurality of home appliances from the first state to a second state.

14 Claims, 14 Drawing Sheets

(56) References Cited

U.S. PATENT DOCUMENTS

| | | | | |
|---|---|---|---|---|
| 2014/0173068 | A1* | 6/2014 | Monma | H04L 61/58 709/221 |
| 2014/0250399 | A1* | 9/2014 | Gaherwar | G06Q 10/06 715/771 |
| 2018/0164758 | A1* | 6/2018 | Liu | G05B 15/02 |
| 2019/0200872 | A1* | 7/2019 | Matsuoka | G08B 19/00 |
| 2020/0312318 | A1* | 10/2020 | Olson | G10L 15/08 |

FOREIGN PATENT DOCUMENTS

| | | | |
|---|---|---|---|
| KR | 10-2019-0079720 | A | 7/2019 |
| KR | 10-2019-0098109 | A | 8/2019 |
| KR | 10-2021-0067785 | A | 6/2021 |
| KR | 10-2021-0122581 | A | 10/2021 |
| KR | 10-2022-0047078 | A | 4/2022 |
| KR | 10-2022-0125656 | A | 9/2022 |

* cited by examiner

INFORMATION PROCESSING METHOD, PROCESSING SYSTEM, AND PROCESSING APPARATUS FOR A HOME APPLIANCE

CROSS-REFERENCE TO RELATED APPLICATIONS

This application is a national stage filing of PCT App. No. PCT/KR2023/013416, filed on Sep. 7, 2023, which claims the priority benefit of Korean Patent Application No. 10-2022-0129584 filed in the Republic of Korea on Oct. 11, 2022, all of which are hereby incorporated by reference as if fully set forth herein.

TECHNICAL FIELD

The present invention relates to an information processing method for home appliances, an information processing system for home appliances, and an information processing apparatus for home appliances.

BACKGROUND ART

Home appliances mainly refer to devices installed in the user's home to help the user with housework. Home appliances may be fixed in the user's home to operate according to user's commands. The user may schedule and operate the home appliances. For example, if plaining to come back home at 5 o'clock, it makes a reservation in advance to allow an air conditioner to operate at 4:30 o'clock. According to this example, a user who return home may enjoy a clean indoor environment.

Home appliances may access the Internet through a wired or wireless communication network, such as Wi-Fi. The user may collect information about operations of the home appliances through the Internet. The user may transmit control commands to the home appliances through the Internet. As described above various services are possible because the user and the home appliances in remote locations communicate with each other. For example, even if an operation of a home appliance has not been reserved, the home appliance may be reserved or operated in real time through the terminal. As a detailed example, even if you do not reserve the operation of the air conditioner when going to work, the user may operate the air conditioner in advance through the terminal when leaving work.

Due to the above technologies, the user may use the home appliances more conveniently. Although it was expected that these various home appliance reservation operations could greatly change the daily life, the reality is that the home appliances are not being utilized as much as expected. The inventor thought deeply about this problem and came up with the present invention.

The inventor found that there was a major problem in that, even if a user made a scheduled operation of a home appliance, it did not operate in a desired operating state. For example, there is technology in KR20190079720, 'A remote control system capable of intelligent heating and cooling control for companion animals and with a built-in lighting function.' This technology discloses a technology that operates heating and cooling as a means for companion animals. However, even if the cooling and heating start, a bigger problem may occur in a situation in which all home appliances do not cooperate with each other. If the above technology is applied while the home's heating is running, the home's heat management system may malfunction due to the cooling being activated simultaneously.

The inventor found that there are many cases in which the operation of the reserved home appliance does not operate in a situation desired by the inventor. For example, the home appliance is driven in an outgoing mode, a heating device such as induction may be automatically turned off. Even in this case, the power to the heating device may not be completely cut off. In this case, the companion animal may initiate the operation of the heating device. This problem may actually lead to fires.

In many other cases, automatic operations of the home appliances may cause various problems such as excessive energy waste, unnecessary damage, and undesirable conditions.

DISCLOSURE OF THE INVENTION

Technical Problem

The present invention proposes an information processing method for a home appliance, an information processing system for a home appliance, and an information processing apparatus for a home appliance, which are capable of responding to a user's schedule.

The present invention proposes an information processing method for a home appliance, an information processing system for a home appliance, and an information processing apparatus for a home appliance, in which an home appliance optimally operates even when a user in not aware of the home appliance.

The present invention proposes an information processing method for a home appliance, an information processing system for a home appliance, and an information processing apparatus for a home appliance, which a reservation operation of a home appliance is further activated.

For further objects of the present invention, refer to the contents disclosed in the effects of the invention and the specific details for carrying out the invention.

Technical Solution

An information processing system for a home appliance according to the present invention may include: at least one home appliance; a terminal configured to process information of the at least one home appliance; an individual service area configured to provide an individual service; and an information processing apparatus connected to the terminal and the at least one home appliance through a network and configured to provide an application service using the individual service. The system may identify user needs for service the individual and provide a corresponding application service.

Optionally, the information processing apparatus may be configured to: receive basic information that a user using that at least one home appliance goes out; and confirm user's schedule information indicating the user's outgoing from the basic information by using the individual service. Information related to the user's schedule information may be confirmed. The confirmed information may be used to control the home appliance.

Optionally, the information processing apparatus may be configured to: confirm a first state of the at least one home appliance; and change a first home appliance of the at least one home appliance from the first state into a second state in response to the schedule information. According to this system, a user may not need to know what state the home appliance is currently in. According to this system, the state of the home appliance may be changed to the state desired by the user without specific instructions from the user. The user may conveniently use the plurality of home appliances.

Optionally, the information processing apparatus may be configured to: confirm a first state of the at least one home appliance; and maintain a second home appliance of the at least one home appliance in the first state in response to the schedule information. According to this system, the plurality of home appliances may operate in different operating states. As a result, the home appliances may operate differently depending on a relationship between the home appliance and the user.

Optionally, the basic information may be input from the terminal. The user may conveniently transmit their own voice and text messages.

Optionally, the second home appliance may include any one of a first group of the home appliances that operate and shut down normally according to the prior reservation information, and a fourth group of home appliances that operate normally in spite of the schedule information. A device that operates regardless of the user's outgoing may operate independently.

Optionally, the first home appliance may include any one of a second group of home appliances that no longer require operation according to the schedule information, and a third group of home appliances for which a forced lock is set according to the schedule information. Thus, the home appliance may be safely used.

Optionally, the information processing apparatus may be configured to transmit information of the third home appliance belonging to the fifth group that requires additional action by the user in response to the schedule information. The user may confirm the state of home appliances that require additional processing upon the outgoing.

Optionally, in the information processing apparatus, at least one of the first state or the second state of the at least one home appliance may be transmitted to the terminal. As a result, the users may conveniently confirm the states.

According to the present invention, an information processing system for a home appliance may include optionally an information processing apparatus, and the information processing apparatus may be configured to perform: receiving of basic information for requesting care of a companion animal from a user using the at least one home appliance; and confirming of schedule information indicating the user's companion animal care request using the individual service. The information processing apparatus may confirm information related to the user's requested information about companion animals. The confirmed information may be used to control home appliances to suit the companion animal.

Optionally, the information processing apparatus may be configured to: confirming of a first state of the at least one home appliance; changing of a first home appliance of the at least one home appliance from the first state to a second state in response to the schedule information; and determining of an operation of a second home appliance of the at least one home appliance using the acquired information of the first home appliance. According to this system, a user may not need to know what state the home appliance is currently in. According to this system, the state of the home appliance may be changed to the state desired by the user without specific instructions from the user. According to this system, the second home appliance may operate more accurately. As a result, the user may conveniently use the plurality of home appliances.

Optionally, the first home appliance may be a camera. Optionally, the second home appliance may be at least one of an air purifier, a robot vacuum cleaner, or an air conditioner. Accordingly, the air purifier, the robot vacuum cleaner, and the air conditioner may operate according to the condition of the companion animal included in the image information of the camera. Accordingly, the companion animal may live more comfortably.

An information processing apparatus for a home appliance may include: a confirmation module configured to confirm an operation state of at least one home appliance in response to a node request; and an operation determination module configured to perform, when there is a trigger signal containing schedule information comprising user's outgoing. Accordingly, the home appliance may be conveniently used in response to the user's needs.

An information processing system for a home appliance according to the present invention may include: a confirmation module configured to confirm an operation state of at least one home appliance in response to a node request; and an operation determination module configured to maintain an operation state of any one home appliance of the at least one home appliance in a first state when there is a trigger signal containing the user's schedule information including user's outgoing. Accordingly, the home appliance may be conveniently used in response to the user's needs.

An information processing apparatus for a home appliance according to the present invention may include: a confirmation module configured to confirm an operation state of at least one home appliance in response to a node request; and an operation determination module configured to determine to inquire from the terminal whether to maintain the first state of the operation state of one of the at least one home appliances when there is a trigger signal containing schedule information including the user's going out. Accordingly, the home appliance may be conveniently used in response to the user's needs.

Optionally, the operation determination module may include an operation sequence determination part, wherein the operation sequence determination part may be configured to determine that a first home appliance of the at least one home appliance operates before a second home appliance of the at least one home appliance in response to the schedule information. According to this apparatus, a user may not need to know what state the home appliance is currently in. According to this system, the state of the home appliance may be changed to the state desired by the user without specific instructions from the user. The user may conveniently use the plurality of home appliances.

An information processing method for a home appliance may include: allowing an information processing apparatus to receive a trigger signal indicating user's outgoing from a node; understanding meaning of the trigger signal using an individual service; allowing the information processing apparatus to identify a first state of at least one home appliance; and at least two of, corresponding to the meaning of the trigger signal. Accordingly, the user's needs may be accurately and conveniently identified, and the home appliance may accurately operate in response to the identified information.

Optionally, the information processing method for the home appliance may include at least two of, corresponding to the meaning of the trigger signal; performing an application service that changes an operation state of a first home appliance of the at least one home appliance from the first state to a second state; performing an application service that maintains an operation state of a second home appliance of the at least one home appliance in the first state; performing an application service that inquires whether or not to maintain an operation state of a third home appliance of the at least one home appliance to the user; and performing an application service that determines an operation of a fifth home appliance of the at least one home appliance by using information acquired from the fourth home appliance of the at least one home appliance. Accordingly, since the plurality of home appliances may be controlled in various states, there may be an advantage of improving user convenience. Here, it may be more convenient because the user does not have to give direct commands.

Optionally, the first home appliance may include a heating cooking appliance. The second state may include the heating and cooking appliance being forcibly locked. Accordingly, the heating and cooking appliance may be safely used.

Optionally, the second home appliance may include a washing machine. The first state may include that an end of washing is scheduled. Accordingly, the washing machine may be used more cleanly.

Optionally, the third home appliance may include an oven. The first state may include a state in which food cooked in the oven is accommodated. Accordingly, the state of the cooking appliance may be informed even if the user has forgotten.

Optionally, the fourth home appliance may include a camera. The fifth home appliance may include at least one of an air purifier, a robot vacuum cleaner, and an air conditioner that operates using photographing information from the camera. Accordingly, the home appliances may be interlocked with each other to improve user convenience. Particularly, it may be conveniently used when the user does not take care of own companion animal.

Optionally, the camera may be mounted on at least one home appliance. Accordingly, the method may operate without a separate imaging device.

Optionally, the fourth home appliance may include a camera, and the fifth home appliance may include an air purifier that operates using photographing information from the camera. Accordingly, a clean indoor environment may be established.

Optionally, the information processing method may further include, while performing any one of the application services; allowing the information processing apparatus to receive the trigger signal indicating the user's outgoing from the node; and determining whether the user is an adult. Accordingly, the home appliance may be used differently depending on the person return home. Optionally, if the person return home is not the adult, the information processing method may maintaining least one of the application services. Accordingly, a risks caused by home appliance may be prevented.

Optionally, the information processing method may further include: receiving the other trigger signal for requesting care of a companion animal in addition to the trigger signal; and operating at least one of an air purifier, a robot vacuum cleaner, or an air conditioner using information acquired from the camera. Accordingly, there is an advantage in that the information processing method that considers the safety of the companion animal that are indoors for a long period of time is possible.

Optionally, the information processing method may further include operating at least one of the air purifier, the robot vacuum cleaner, and the air conditioner using companion animal information stored in a memory when receiving the other trigger signal. Optionally, the robot vacuum cleaner may perform cleaning along a movement trajectory of a companion animal in the acquired information. Accordingly, it may be possible to eliminate pollution of the indoor environment caused by the companion animal. The users may use the home appliance comfortably.

Advantageous Effects

According to the present invention, the user may change the reservation operation of the home appliance simply by notifying the his or her schedule by the user. Accordingly, there may be the advantage in that the optimal operation of the home appliance is achieved on its own even when the user is not aware of the reservation operation.

According to the present invention, even if there is no scheduled operation of the home appliance, the home appliance may operate in the energy-saving environment according to the user's actual schedule.

According to the present invention, there may be the advantage that the user's life is enriched by artificial intelligence tasks that match the operation of the home appliance and the user's schedule.

According to the present invention, the reservation operation of the home appliance may be further activated to provide the advantage of making the user's life more convenient.

According to the present invention, at least two home appliances may perform the cooperative operation.

Accordingly, the optimal indoor environment may be established.

For further effects of the present invention, refer to the contents disclosed in the specific details for carrying out the invention.

MODE FOR CARRYING OUT THE INVENTION

Figure 1:
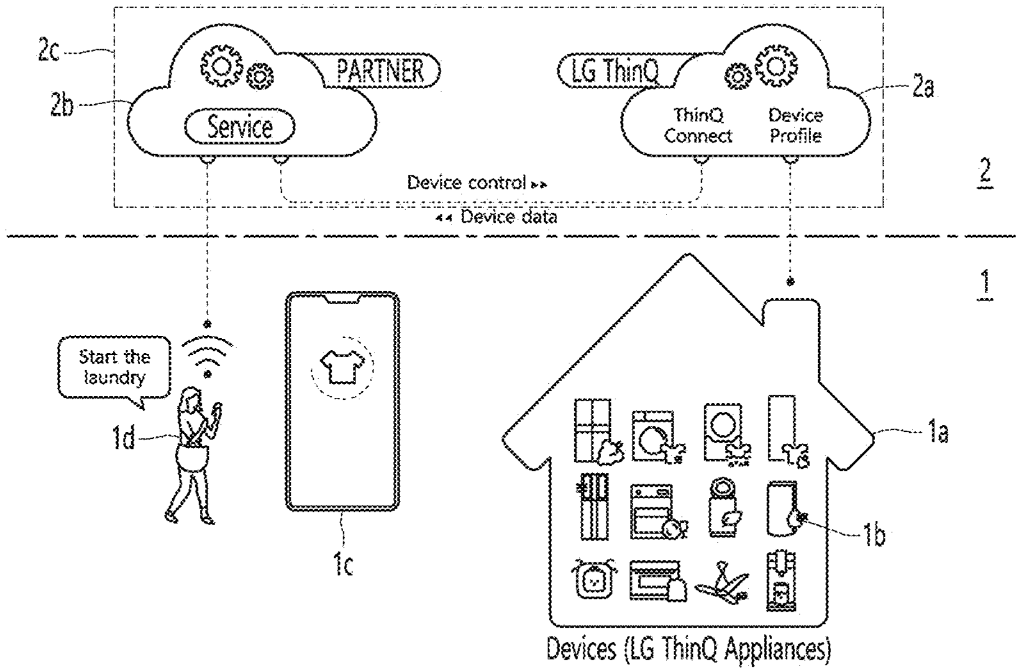
FIG. 1 is a view illustrating an information processing system for a home appliance according to an embodiment.

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, and adding components; rather, it will be deleting, understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

In this application, the information processing method, the information processing system, and the information processing apparatus examine the same inventive idea from different aspects. Any shortcomings in one embodiment may be supplemented by explanation of other embodiments. Any portion of one embodiment may be expanded or changed according to the description of other embodiments.

In the description of the drawings, identical or similar components are given the same reference numbers regardless of reference numerals, and duplicated descriptions thereof may be omitted.

The suffixes "module" and "unit" for components used in the description below are assigned or mixed in consideration of easiness in writing the specification and do not have distinctive meanings or roles by themselves.

In describing the embodiments disclosed in this application, detailed descriptions related to well-known functions or configurations will be ruled out in order not to unnecessarily obscure subject matters of the present invention.

However, this does not limit the present invention within specific embodiments and it should be understood that the present invention covers all the modifications, equivalents, and replacements within the idea and technical scope of the present invention.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless referred to the contrary.

In this application, the terms "comprises" or "having" are intended to indicate that there is a feature, number, step, operation, component, part, or combination thereof described in the specification, d one or more other features. It is to be understood that the present invention does not exclude the possibility of the presence or the addition of numbers, steps, operations, components, components, or a combination thereof.

In this application, home appliances may also include the same type of devices, but be used for commercial, public, and other purposes other than at home.

In this application, a service may include a processor that provides processing results for requests for a specific purpose. Here, the service may be an abbreviation for a service module. Here, the processor may include hardware, software running on specific hardware, or software running on general-purpose hardware. The service may refer to certain data.

In the description of the method of the present application, even if the process first (e.g., S1) is performed before the second process (e.g., S2), the first process does not necessarily precede the second process. According to contents of the embodiment, the processes may be changed.

FIG. 1 is a view illustrating an information processing system for a home appliance according to an embodiment.

Referring to FIG. 1, an information processing system for a home appliance may include a user area 1 and an operator area 2. The user area 1 may be a dominant area for a user who use home appliances. The operator area 2 may be a control area of an operator who provides the home appliances, operates the system, or provides a services.

The user area 1 may include a building 1*a*. The home appliances 1*b* may be placed in the building 1*a*. The building 1*a* may be connected to any structure to which a network is connected. The home appliances 1*b* may include home appliances such as massagers, water purifiers, vacuum cleaners, clothes care machines, refrigerators, washing machines, air purifiers, cookers, and air conditioners. The home appliances are not limited thereto, and may include various devices such as automobiles, plant cultivators, and pumps. The user area 1 may include a terminal 1*c*. The user 1*d* may perform communication using the terminal 1*c*. The terminal 1*c* may be linked to any structure to which a network is connected. The terminal may be compatible with the home appliance. At least one terminal may be provided. The terminal may include at least two for direct or indirect interaction between the terminals.

The operator area 2 may include a server 2*c*. The server 2*c* may perform at least some functions of the information processing apparatus according to the present invention. The server 2*c* may be an operation server that operates the home appliance. In this case, the operation information of the home appliance may be obtained. The server 2*c* may be a communication server that communicates with the terminal. The server 2*c* may be a server of a manufacturer of the home appliance. The server 2*c* may be a server of an operator of the home appliance. In this case, management of the home appliance may be performed. For example, a quality control may be performed. The server 2*c* may include a first server 2*a* that communicates with the home appliance 1*b*. The server 2*c* may include a second server 2*b* that communicates with the terminal 1*c*. The first and second servers 2*a* and 2*b* may communicate with each other. The first and second servers 2*a* and 2*b* may not be separated, but may be configured as a single device. The first and second servers 2*a* and 2*b* may be implemented by at least one cloud system.

The first server 2*a* may receive usage information including an operation state of the home appliance 1*b*. For example, usage information such as an operation time, an operation mode, and a failure state of the home appliance 1*b* may be received. The first server 2*a* may control an operation of the home appliance. The second server 2*b* may transmit the operation state of the home appliance 1*b* and necessary information to the terminal 1*c*. Here, the necessary information may include all pieces of information that are helpful to the user 1*d* in relation to the home appliance. The second server 2*b* may receive request information from the terminal 1*c*. Here, the request information may be control information of the home appliance 1*b*, which is desired by the user.

The first server 2*a* may transmit the state information of the home appliance 1*b* to the second server 2*b*. The second server 2*b* may transmit the control information of the home appliance 1*b* to the first server 2*a*. The second server 2*a* may provide services to the user. Here, the service may include the operating of the home appliance in response to the user's needs.

The interaction between the server 2*c*, the home appliance 1*b*, the terminal 1*c*, and the user 1*d* will be briefly described.

The server may manage all of the home appliances that are the target of the service in order to perform the service. The home appliance may be connected to the server through the communication to execute commands transmitted from the server. The server may receive service request. The service request may be received by the server through the home appliance. The terminal may apply for the service request. The terminal may refer to devices having a communication module, such as mobile phones, smartphones, laptops, and computers. The terminal may communicate directly with the server. The server may communicate with the home appliance.

The home appliance may have a unique device ID. The ID may be registered and managed on the server. When the home appliance accesses the server, the server may specify the home appliance through the device ID. The server may manage characteristic information of the home appliance together with the device ID.

The home appliance may be fixed within the building. Stable communication with the server may be possible through an AP within the building. The terminal may communicate indirectly with the home appliance through the server.

The user may request and receive the service for the home appliance registered on the server through the home appliance. However, it may not be easy to request the service from the server through the home appliance. In this case, the service may be requested from the server through a device carried by the user such as the terminal. For this, an application program capable of implementing the service may be installed in the terminal.

The user may request service by accessing the server and inputting the unique device ID of the home appliance which wishes to receive the service. The user may be given a user ID and password. The user may log in to a site operating by the server and register all of own home appliances. The home appliances registered to the server may be registered to the server together with the corresponding user ID. This may be done by transmitting the user ID and the unique device ID of the home appliance matched with the user ID to the server through the site. The server may store user information related to the user and home appliance information related to the home appliance through the processes. The user information and the home appliance information may be matched and be stored on the server.

The user may register as a member of the site through an application installed on the terminal and be given a user ID and password. The user may recognize the application as an applicant's ThinQ app. The user may register all of their home appliances with the above application. The application may be provided for a remote service of at least one home appliance.

The user may request the service through the terminal and easily obtain information such as service performance and completion. The service processing process may include receiving the service request to the server through at least one of the site, the terminal, and the home appliance, processing the service request by the server, and executing a command for the corresponding service according to a processing code.

Figure 2:
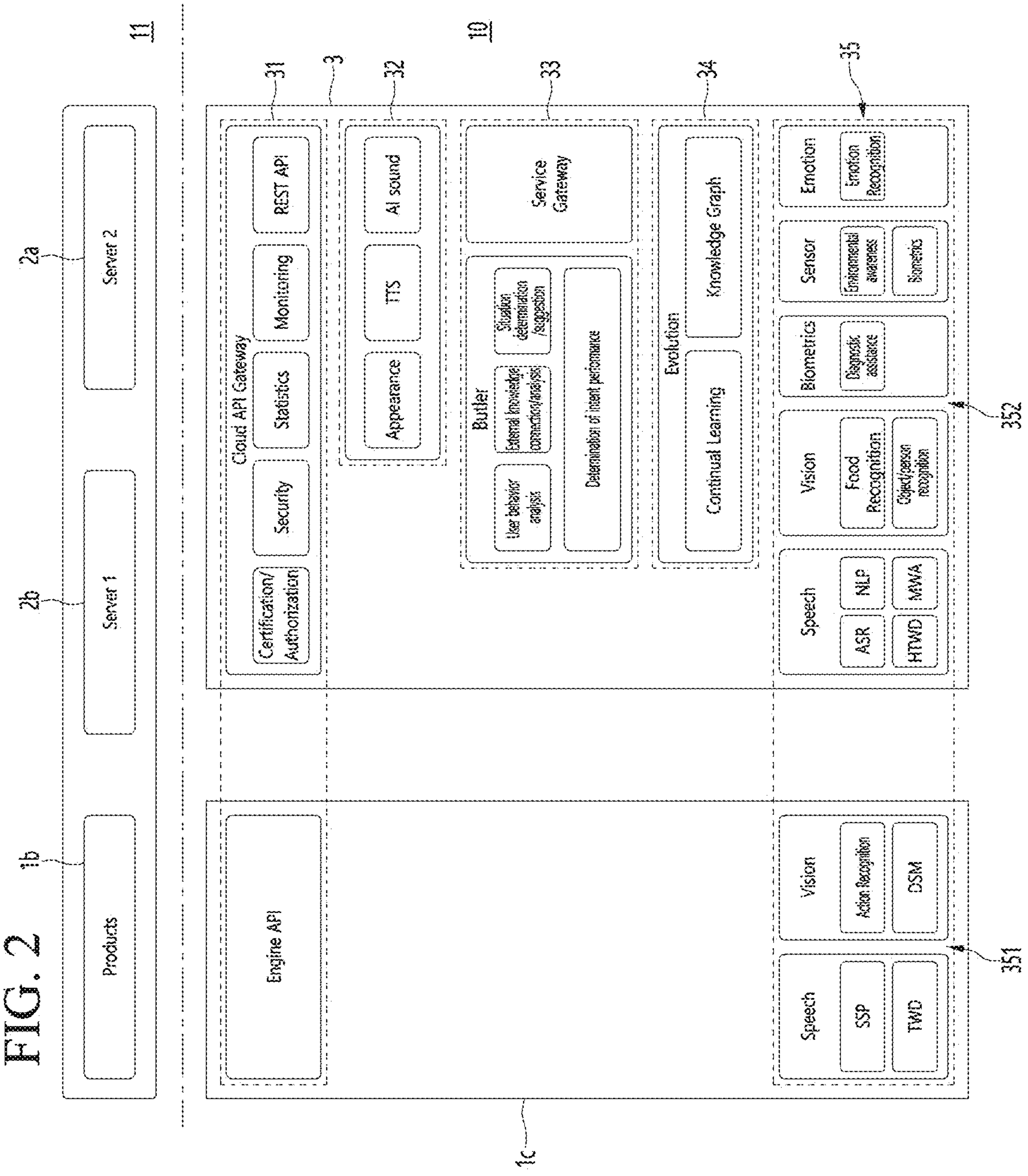
FIG. 2 is a view illustrating a configuration of the information processing system for the home appliance, which shows a cloud system in more detail.

FIG. 2 is a view illustrating a configuration of the information processing system for the home appliance, which shows a cloud system in more detail. Referring to FIG. 2, the information processing system according to an embodiment may be divided into an individual service area 10 and an application service area 11. In the individual service area 10, basic information for operating an information processing method, an information processing apparatus, and an information processing system according to an embodiment may be processed. The basic information may be first information for requesting an application service. For example, the basic information may be a user's voice saying that a user goes out. The voice may be basic information, and a service of the individual service area 10 may understand meaning of the voice.

The individual service area 10 may include at least one processor for an individual service. The application service area 11 may provide an application service to the user by applying the individual service supplied from the individual service area 10. The application service area 10 may include one or more processors for the application service. The processor may include hardware and software running on the hardware. The servers 2*a* and 2*b* may be implemented on a cloud system 3. The servers 2*a* and 2*b* may be implemented as one component of the cloud system, but for ease of understanding and differences in operation, the servers 2*a* and 2*b* may be displayed separately as illustrated in the drawing.

In the application service area 11, the home appliance 1*b* and the server 2*c* may be placed. The home appliance may include a plurality of devices already described. The server may communicate with the home appliance. The application service provided in the application service area may include a service directly requested by the a service indirectly requested by the user, a service that is considered requested by the user, and a service that is assumed to have been requested by the user. The application service may be determined by the server. The server may control the home appliance. The server may receive information about the home appliance. The server may communicate with the user through the terminal or home appliance.

The individual service area 10 may include a cloud system 3 and an edge device. The edge device may be a user's terminal 1*c* as an example. Here, the terminal may mean at least two terminals beyond a terminal of a single individual. The cloud system 3 may have large capacity and high-speed information processing capabilities. The cloud system may perform a heavy individual service 352 that requires a lot of resources to operate the service. The edge device may have small capacity and low-speed information processing capabilities. The edge device may provide a lightweight individual service 351 that requires a high-speed operation rather than accuracy.

The server 2*c* may initiate service in response to any one of several requests such as a request from the terminal 1*c*, a request from the home appliance 1*b*, and fulfillment of preset requirements.

If there is a request for the service, the server 2*c* may perform information processing corresponding to the requested service. The information processing may be performed by referring to information previously stored in a memory 40. The server may call at least one service of the individual service area 10 to perform the requested service. The server may use a combination of two or more services of the individual service area. The server may use the edge device for the individual service that requires rapid performance. The server may use the cloud system 3 for the individual service that requires accurate performance.

The performance result of the requested service may be in various forms, such as reporting to the user, controlling of the home appliance, and information storage. The performance result of the requested service may correspond to the requested service.

The performance process and result of the requested service may be notified to the terminal 1*c* and the home appliance 1*b*.

The plurality of individual services may be provided in the cloud system. The individual service may be performed by various service nodes such as virtual/physical machines, virtual/physical boxes, virtual/physical switches, and clusters in the cloud.

The individual service area may include an external management service 31 that manages the cloud and edge devices. The management service may include an interface. The management service may be provided to the cloud and edge devices. The individual service area may include an expression service 32 that provides a method of increasing in recognition corresponding to the user. The individual service area may include a butler service 33 that identifies the user's needs. The individual service area may include an awareness enhancement service 34 to improve performance of the butler service and the service. The individual service area may provide a recognition service 35.

Each of the above individual services will be described in more detail. The individual service may include various services that are presented below.

The management service 31 may include an application programming interface (API). The API may be a connection between computers or computer programs. The API may be a type of software interface and may provide the service to other types of software. The API may be applied to the edge device.

The management service 31 may include an API gateway. The API gateway may be a traffic manager that connects to an actual backend service or data and protects sensitive data by applying policies, authentication, and general access controls to API calls. The API gateway may perform authentication/authorization, security, statistics, and monitoring. A REST API may be an API that adheres to design principles of an REpresentational state transfer (REST) architectural style. The REST API may be said to comply with several principles applied in the cloud service.

The expression service 32 may include text-to-speech (TTS), i.e., voice synthesis. The TTS is a technology in which a machine automatically generates sound waves of speech sounds. For example, the TTS is a technology in which speech sounds of a person selected as a model are recorded, divided into certain speech units, and then coded and input into a speech synthesizer (speech computer, speech synthesizer). Then, only the necessary speech units recombined according to instructions to create speed sounds artificially. The TTS may have various implementation methods.

The expression service 32 may include an AI sound. The AI sound technology that uses artificial intelligence (AI) to listen to sound and recognize a situation. For example, a scream or a sudden stop of a vehicle may be determined by listening to the sound.

The expression service 32 may include an appearance technology. An example of the facial expression technology is a technology that estimates feelings by looking at a face.

The butler service 33 may receive text, image information, sensor information, and situation information, which are the results of recognizing the user's voice input, as input data to determine the information based on a user's profile, context, and knowledge, thereby providing natural control and response. The butler service may use the recognition technology to analyze data received as input. The butler service may be linked to external services by determining the information as a knowledge base built on a knowledge management system (KMS). The butler service 33 may include user behavior analysis, external knowledge connection, external knowledge analysis, situation determination and response proposal, and intention execution determination.

The butler service 33 may provide control and response tailored to the conversation context and user situation by utilizing functions of the independently existing AI module. The user may feel customized services for themselves through the butler service 33.

The butler service 33 may include a service gateway that may access the external knowledge. The service gateway is a gateway for accessing the external services. The gateway may refer to a computer or software that enables communication between networks using different communication networks and protocols in the computer network. For example, the gateway may be a network point that acts as an entrance from one network to another network.

The recognition enhancement service 34 may include a learning processor. The cognitive enhancement service 34 may include continuous learning. The continuous learning is a method of upgrading one model little by little to enable to handle multiple tasks. In other words, the continuous learning is a method of improving model performance by continuously learning new data/tasks each time new learning is done, without forgetting previously learned data.

The recognition enhancement service 34 may include a knowledge graph. The knowledge graph may refer to a collection of interconnected descriptions of entities such as individuals, events, or concepts. The knowledge graph may store linking and semantic metadata within the context. This approach may provide a framework for data integration, unification, analysis, and sharing.

The recognition service 35 may include a speech service. The speech module may include various processors. The speech module may be used most accurately and conveniently by a remote user. The speech module has developed significantly compared to other modules.

The speech service may include a speech signal processing (SSP) service. The voice signal processing service is a function for applications such as voice communication and voice recognition. The sound source input to a microphone is of poor quality because of containing various noises from the surrounding area. Since low-quality sound sources are not used as is in voice calls or voice recognition programs, an SSP engine may be used to remove the noise and improve the quality of the sound source.

The speech may include a voice recognition (ASR: automatic speech recognition) service. The voice recognition service may provide a service that receives the user's voice data and converts the voice into text. The sound 'outgoing' may be changed to the word 'outgoing'.

The speech may include a natural language processing (NLP) service. The natural language processing service may mean converting natural language, which is human language, into a semantic structure that machines may understand. The word 'outgoing' may mean understanding the word as outgoing: going out of the house.

The speech may include a hybrid trigger word detection (HTWD) service. The HTWD service may include firstly performing embedded-based startup word detection and secondly performing server-based startup word detection to minimize misrecognition of startup words.

The speech may include a trigger word detection (TWD) service. The TWD service may construct speech data sets and implement algorithms for trigger word detection (also known as keyword detection or wake word detection). The trigger word detection may allow devices such as Amazon Alexa, Google Home, Apple Siri, and Baidu DuerOS to hear a specific word and trigger the device to wake up. The TWD may mean performing maneuver word detection with a small capacity engine. For example, when a user says, 'enable outgoing mode,' the word 'outgoing' may be searched as a trigger word.

The speech may include a multi-device wakeup arbitration (MWA) service. The MWA service may be a service that selects the most appropriate device for the user when multiple devices recognize the same startup word at the same time. The MWA service measures the user's direction, distance, etc., selects the device that may best recognize the user's voice commands, and provides feedback to the user. For example, when the startup word is recognized for an air conditioner, a television, and an oven at the same time, a service for selecting a suitable device may be provided.

In the speech services, the speech signal processing (SSP) service and the trigger word detection (TWD) service may be included in the edge device 1*c*. Because the two services are lightweight, the services may fully run on the edge device's capacity. This is because the above two services are conveniently used for the purpose of the edge device.

The recognition service 35 may express a vision service. The vision service may include various sub-services. The vision service may correspond to services that a user may perceive with his/him eyes.

The vision service may include a food recognition service. The food recognition service may recognize a location of food stored in the refrigerator. For example, using an image of an egg, the user may photograph the egg and find out the location of the egg from the photographed image. The food recognition service may recognize food in various manners such as shape and barcode. The recognized foods may be managed on the server.

The vision service may include an object/person recognition service. The person/object recognition service may distinguish a target person/object using a two-dimensional and three-dimensional shape of an object. The classified information may be used for various purposes such as identification, movement, and recognition.

The vision service may include a driver state monitoring (DSM) service. The driver state detection service may detect the user's face from video image data, track gaze, and track eye closure and eye blinking to provide a location of the face, a head direction, facial feature points, gaze direction and angle, and a degree of eye closure. The driver state detection service may detect driver's drowsiness and issue a warning.

The vision service may include a behavior recognition service. The behavior recognition service may be a service that recognizes the user's behavior as an activation signal. For example, the behavior recognition service may be a service that starts the terminal by the user shaking the terminal. The DSM service and behavior recognition service may be implemented in the edge device.

The recognition service 35 may include a biometric service. The biometric service may be an example of any service that determines user's health information. For example, a diagnostic assistance service may be performed using heart rate, information, and sleep information transmitted using a smartwatch.

The recognition service 35 may include a sensor service. The sensor service may perform services such as recognizing environments and biometrics through the transmitted information.

The recognition service 35 may include an emotion service. The emotion service may include emotion recognition (ER) service. The emotion recognition service is a service that recognizes emotions from the user's facial expression, voice, or text entered by the user. The ER services that recognize emotions enable natural verbal and non-verbal communication between the user and the machine to help the people and machines to communicate and interact smoothly with each other.

In the individual service area 10, various other services such as gait tracking and behavior prediction may be applied. Each of the service in the individual service area 10 may provide other services by linking one service with another service. The services of the edge device 1*c* may be equipped with services that require speed. The services of the individual service area 10 may be linked to other external networks.

The cloud system may be equipped with services that require accuracy and complexity. The edge device and the cloud system may cooperate with each other. For example, after starting up with the word recognized in the TWD of the edge device 1*c*, the cloud system 3 may accurately determine using the HTWD. As another example, the behavior recognition recognized in the vision service of the edge device 1*c* may be used as information for other purposes in the object/person recognition service of the cloud system 3.

Each service in the individual service area 10 may operate as a learning model of artificial intelligence. The recognition enhancement service 34 may be constructed as the learning model. For example, at least one of the expression service 32, the butler service 33, the recognition enhancement service 34, and the recognition service 35 may be provided as a learning model using artificial intelligence. Each service in the individual service area 10 may be implemented as a table or an operation formula constructed as a mathematical formula. Each service in the individual service area may contain a mixture of the learning model and calculation formulas using the artificial intelligence.

Each service in the individual service area 10, i.e., the service module may return the processing result of the service request to the application service area.

In all of the following embodiments, there may be no specific mention of the service module of the individual service area called by the application service area. In this case, all the individual service modules, which are capable of replying, may reply to the service request, corresponding to the nature of the call by the application service in the application service area. There may be specific reference to the service module of the individual service area called by the application service area. In this case, an example is described, and it does not exclude that service modules in other individual service areas reply.

Figure 3:
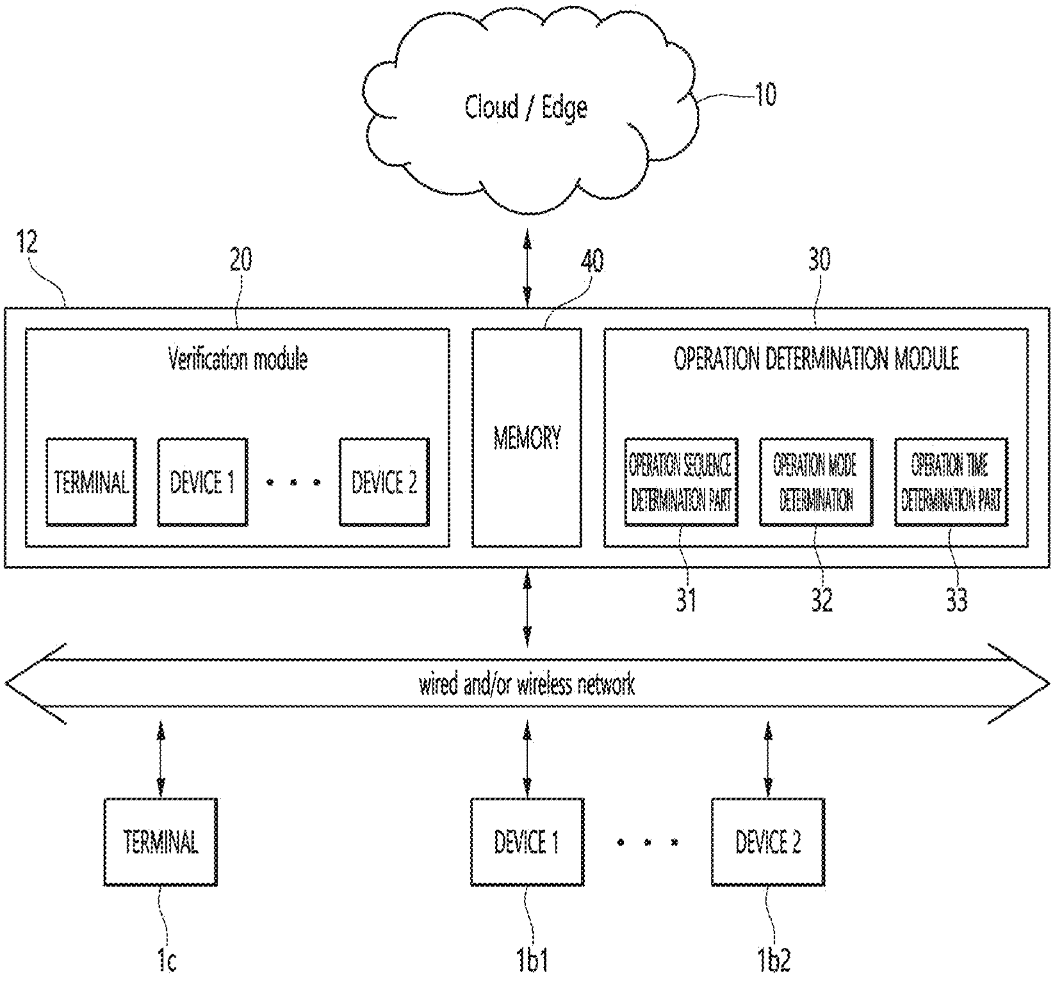
FIG. 3 is a view for explaining an information processing apparatus for a home appliance according to an embodiment.

FIG. 3 is a view for explaining an information processing apparatus for the home appliance according to an embodiment.

Referring to FIG. 3, the information processing apparatus 12 according to an embodiment may include a confirmation module 20 that confirms a status of each node, a memory 40 that stores information necessary for information processing, and an operation determination module 30 that determines an operation of each node in response to a situation confirmed by the confirmation module. The node may include a home appliance and a terminal. The nodes do not exclude a terminal, a cloud system, and an edge device. A flow of information between the confirmation module, the memory, and the operation determination module may be performed by an internal bus. The confirmation module, the memory, and the operation determination module may share information with each other.

The information processing apparatus 12 may use an individual service of the individual service area 10. The information processing apparatus 12 may provide an application service. The information processing apparatus 12 may be a main processor that provides the application service. The information processing apparatus 12 may include a separate processor that provides the application service. The information processing apparatus 12 may be connected to the terminal 1*c* and the home appliances 1*b*1 and 1*b*2 through a wired or wireless network. The information processing apparatus 12 may be implemented by the server 2*c*.

The information processing apparatus 12 may start an operation by a trigger signal. The trigger signal may mean a starting signal. The trigger signal may be basic information. The basic information may be a simple signal that is not interpreted in itself. The trigger signal may be a direct or indirect signal from the user. For example, the trigger signal may be a user's voice message. In this case, the meaning may be understood after the voice message is processed into natural language. The individual service used at this time may be the natural language processing service described above.

The trigger signal may be a direct or indirect signal generated from each node connected to the home appliance. The trigger signal may be the fulfillment of a reserved condition. For example, when waking up in the morning is scheduled for 6 o'clock, it may be a signal from the clock that has reached 6 o'clock. As another example, it may be a user detection signal when automatically detecting the user.

The information processing apparatus 12 may request an individual service from the individual service area using the basic information. Here, the individual service may include understanding the meaning of the trigger signal, which is the basic information. Here, a speech service of the recognition service 35 may be used as the individual service. In the case of fulfillment of the reserved condition, the meaning has already been interpreted, and thus, understanding of the meaning may not be necessary even though it is the trigger signal.

The confirmation module 20 may receive the trigger signal. The confirmation module 20 may confirm each node in response to the trigger signal. The operating state of the home appliance may be known in response to the confirmation module 20. The application service may include confirming the operation state of the home appliance. The above home appliance may be used by multiple people. The home appliance may have a reservation operation scheduled in advance. For example, the confirmation module may determine information such as whether the home appliance is currently operating, waiting for operation, whether the operation has ended, and what specific contents of the operation standby state are. The information identified by the confirmation module 20 may be stored in the confirmation module for each home appliance.

With reference to the information identified by the confirmation module 20, the operation determination module 30 may determine the operation of the home appliance. The application service may include determining the operation of the home appliance. The operation determination module may determine an operation in response to the trigger signal. The operation determination module may determine an operation corresponding to the user's service request.

The operation determination module may include an operation sequence determination part 31. The operation sequence determination part 31 may determine an operation sequence of at least two home appliances that interoperate with each other. Here, the operation sequence may be different from the operation sequence of the home appliance confirmed by the confirmation module. The operation determination module may include an operation mode determination part 31. The operation mode determination part 31 may determine an operation mode of at least one home appliance. Here, the operation mode may be different from the operation mode of the home appliance confirmed by the confirmation module. The operation determination module may include an operation time determination part 33. The operation time determination part 33 may determine an operation time of at least one home appliance. Here, the operation time may be different from the operation time of the home appliance confirmed by the confirmation module.

The operation determination module 30 may operate with artificial intelligence. The operation determination module 30 may operate using the individual service of the individual service area 10. For example, it may operate using the learning model of the recognition enhancement service 34.

Figure 4:
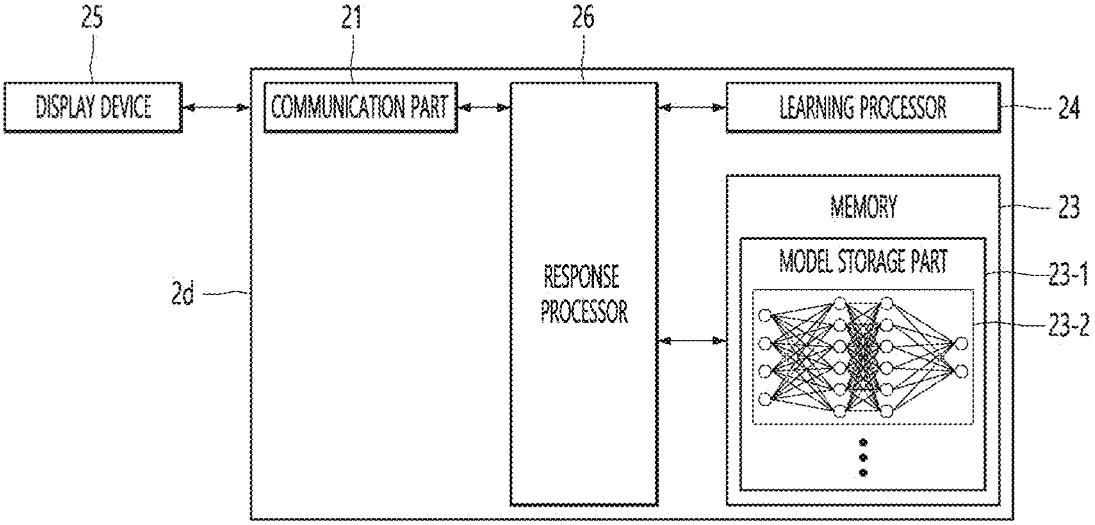
FIG. 4 is a view for explaining an example of providing a learning model.

FIG. 4 is a view for explaining an example of providing the learning model.

Referring to FIG. 4, an artificial intelligence (AI) server 2*d* may refer to a device that learns an artificial neural network by using a machine learning algorithm or uses a learned artificial neural network. The AI server 2*d* may include a plurality of servers to perform distributed processing, or may be defined as a 5G network. In this case, the AI server 2*d* may be included as a partial configuration of the display device 25, and may perform at least part of the AI processing together. The AI server 2*d* may be a portion of the server 2*c*.

The AI server 2*d* may include a communication part 21, a memory 23, a learning processor 24, and a response processor 26. The communication part 21 may transmit and receive data to and from an external device such as the display device 25.

The memory 23 may include a model storage part 23-1. The model storage part 23-1 may store a learning or learned model (or an artificial neural network 23-2) through the learning processor 24.

The learning processor 24 may learn the artificial neural network 23-2 by using the learning data. The learning model may be used in a state of being mounted on the AI server 2*d* of the artificial neural network, or may be used in a state of being mounted on an external device such as the display device 25.

The learning model may be implemented in hardware, software, or a combination of hardware and software. If all or part of the learning models are implemented in software, one or more instructions that constitute the learning model may be stored in memory 63.

The response processor 26 may infer the result value for new input data by using the learning model and may the generate a response or a control command based on t inferred result value.

The learning model implemented by the AI server may be provided for each service provided in the individual service area. Each learning model may provide a response for each service. The operation determination module 30 may receive a response using each learning model.

Figure 5:
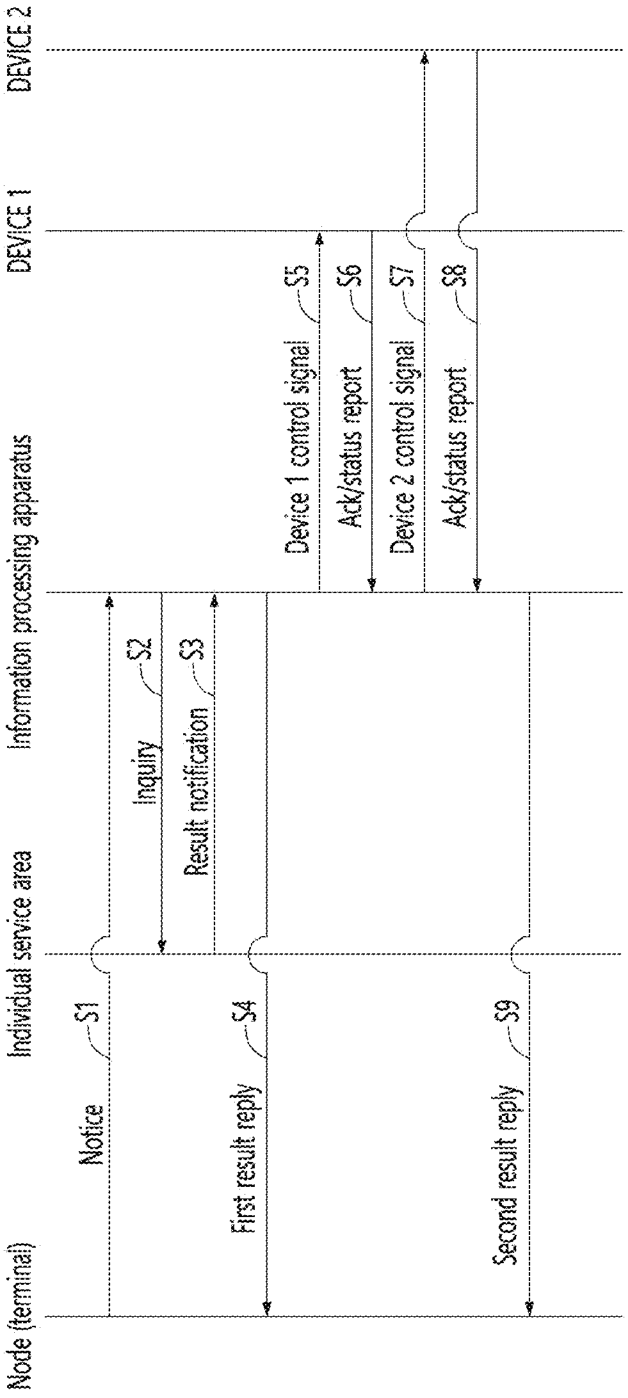
FIG. 5 is a view illustrating a flow of an information processing method according to an embodiment.

FIG. 5 is a view illustrating a flow of an information processing method according to an embodiment.

Referring to FIG. 5, the information processing apparatus 12 may receive the trigger signal from the node (S1). The node may be a terminal or a home appliance. The information processing apparatus may request an individual service from the individual service area (S2). Here, the individual service may include understanding the meaning of the trigger signal. For example, the speech service of the recognition service 35 may be used.

The individual service area perform result notification as a result of responding to the request of the information processing apparatus (S3). The result notification may include at least one of the meaning of the trigger signal, a list of necessary operations corresponding to the trigger signal, or a list of operations required for the node.

The information processing apparatus may perform functions such as selecting a required operation of the home appliance in response to the trigger signal, and selecting an operation required by the user in response to the trigger signal. The information processing apparatus may provide an application service. The information processing apparatus may notify the node of the meaning of the trigger signal, the necessary operation corresponding to the trigger signal, the operation required from the node, and the confirmation result as a first result reply (S4).

The information processing apparatus may transmit a first control signal to the first home appliance (S5). The first home appliance may transmit an Eck signal and a status report signal including the execution result of the first control signal (S6). The information processing apparatus may transmit a second control signal to the second home appliance (S7). The second home appliance may transmit an Eck signal and a status report signal including the execution result of the second control signal (S8).

The information processing apparatus may notify the node of the performance results of the first and second home appliances as a second result reply to the node (S9). The node may include more home appliances in addition to the first and second home appliances. The node may include any one of the first and second home appliances. At least one process of the information processing method may be omitted in the information processing method according to another embodiment. At least one process of the information processing method according to another embodiment may be added to the information processing method.

An information processing method for the home appliance according to an embodiment will be described.

Figure 6:
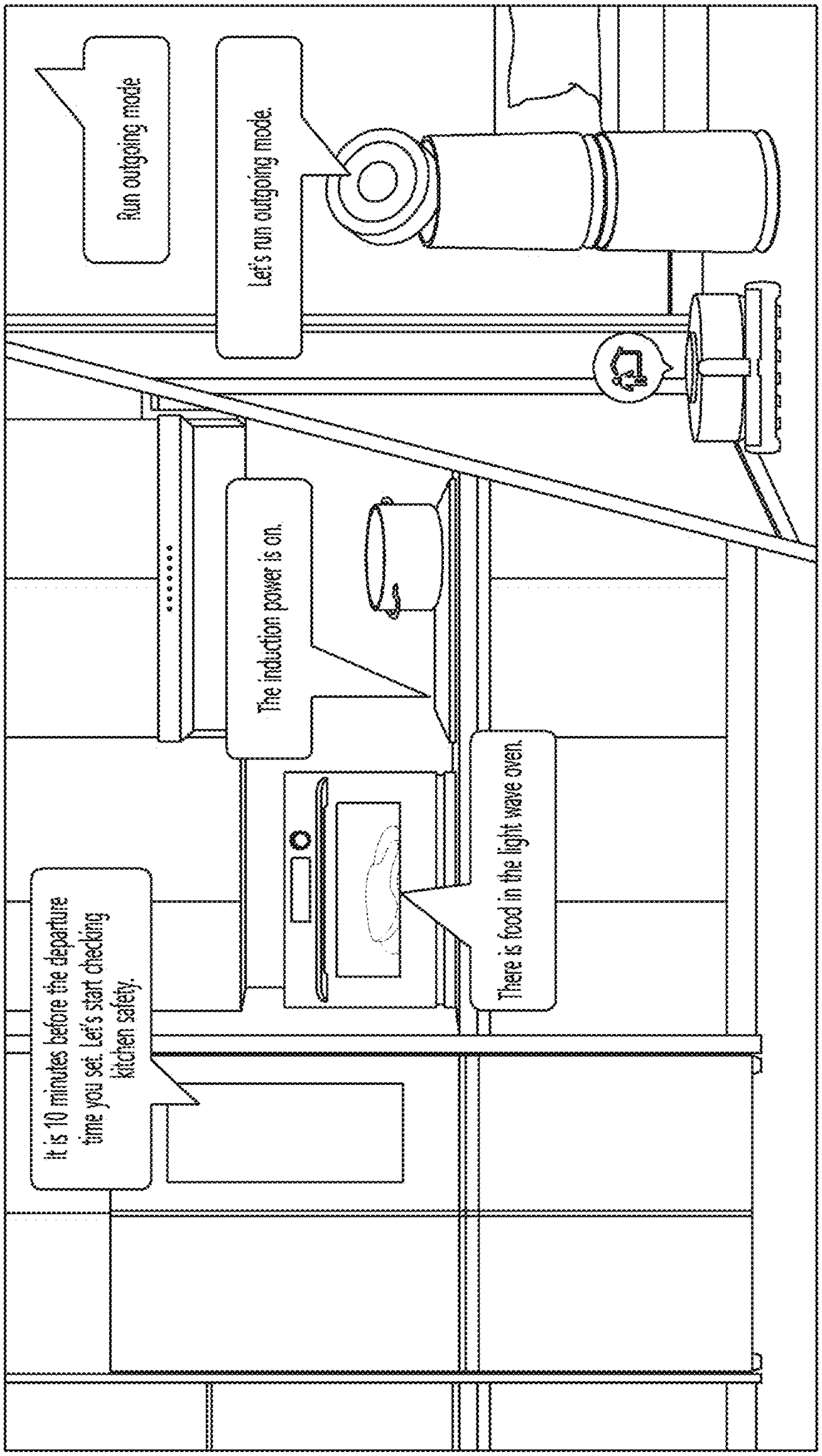
FIG. 6 is a view illustrating an interface in the information processing method according to an embodiment.

FIG. 6 is a view illustrating an interface in the information processing method according to an embodiment. Terms used in the interface in the drawings are directly quoted from the description of the embodiment for convenience of understanding. Other terms and methods with similar meaning may be used. FIG. 6 illustrates user's outgoing as an example. The outgoing may be schedule information of the user.

Referring to FIG. 6, a user 1*d* may use a terminal 1*c* to transmit that his/her goes out. The trigger signal may be "enable outgoing mode." The transmission method to the effect of the outgoing uses voice as an example. In addition, it may be delivered to the information processing apparatus 10 in various manners such as text messages and agreed actions. This process may correspond to the notification process (S1) in FIG. 5.

The user's message may be interpreted to mean that the user goes out. The effect of the user's outgoing may be interpreted by at least one service of the recognition service 35, the butler service 33, or the recognition enhancement service 34 provided as the service in the individual service area 10. The interpreted result may include the effect that the user goes out, and the actions that the home appliance should perform in response to the user's outgoing. This process may correspond to an inquiry process (S2) and a result notification process (S3) in FIG. 5.

In response to the above interpreted results, a reply may be provided from the information processing apparatus to the terminal 1*c* in the form of "Yes, you are going out." The interpreted results may be transmitted to the home appliance. The home appliance that has received this message may reply to the user with "Yes, you are going out." At least one home appliance may be provided. Each of the home appliances may transmit its own message.

The user 1*d* who received the reply may confirm that the information processing system has operated correctly. This process may correspond to the first result replay process (S4) of FIG. 5.

In response to the interpreted results, the information processing apparatus may determine the current state of the home appliance by transmitting the control signal to the device. The home appliance may transmit an ack/status report in response to the control signal. This process may correspond to the control signal and ack/status report (S5 to S8) of FIG. 5. If there is information that the user should pay attention to in the ack/status report (S6) (S8) of the home appliance, the second result reply process (S9) of FIG. 5 may be performed. For example, if there is no signal because the home appliance is not operating normally, the effect may be transmitted as a second result reply. The second result reply may be omitted.

In response to the interpreted results, the information processing apparatus may provide an application service. The information processing apparatus may determine a control signal for performing the application service. The information processing apparatus may transmit and control the control signal to the home appliance. Here, it may be a case that the ack/status report (S6) (S8) of the home appliance has been performed normally. The application service may include at least one of an operation sequence, an operation mode, or an operation time of the home appliance.

In response to the analyzed result, the information processing apparatus may determine at least one of the operation sequence, the operation mode, or the operation time of at least one home appliance. The information processing apparatus may control the home appliance using at least one of the determined operation sequence, operation mode, or operation time. The information processing apparatus may notify the terminal 1*c* of the results of controlling the home appliance. This process may be called a third result reply.

Examples of each reply in the third result reply above are provided. The information processing apparatus may reply to the terminal with "I will execute an outgoing mode" regarding the air purifier. Regarding the heating device, the information processing apparatus may reply to the terminal with "the induction power is on." Regarding the light wave oven, the information processing apparatus may reply to the terminal with "there is food in the light wave oven." Regarding the refrigerator, the information processing apparatus says, "it is 10 minutes before the set outgoing mode." The user may reply through the terminal with "I will start checking kitchen safety." Regarding the robot vacuum cleaner, the information processing apparatus may return an outgoing sign to the terminal. Here, the outgoing sign may be a previously stipulated sign indicating that the user goes out, and thus, cleaning will begin.

The third result reply may also be transmitted through the terminal as described above. Alternatively, in the third result reply, the corresponding home appliance may transmit the message. This is because the user informs that the user goes out and may be inside the house. The message may be transmitted directly to the user. The message may be of various types, such as a stored voice, an alarm, and a stored sign.

The third result reply process may have more diverse cases depending on the information processing method of the home appliance. The user may know that the application service has been properly performed through the third result reply.

Figure 7:
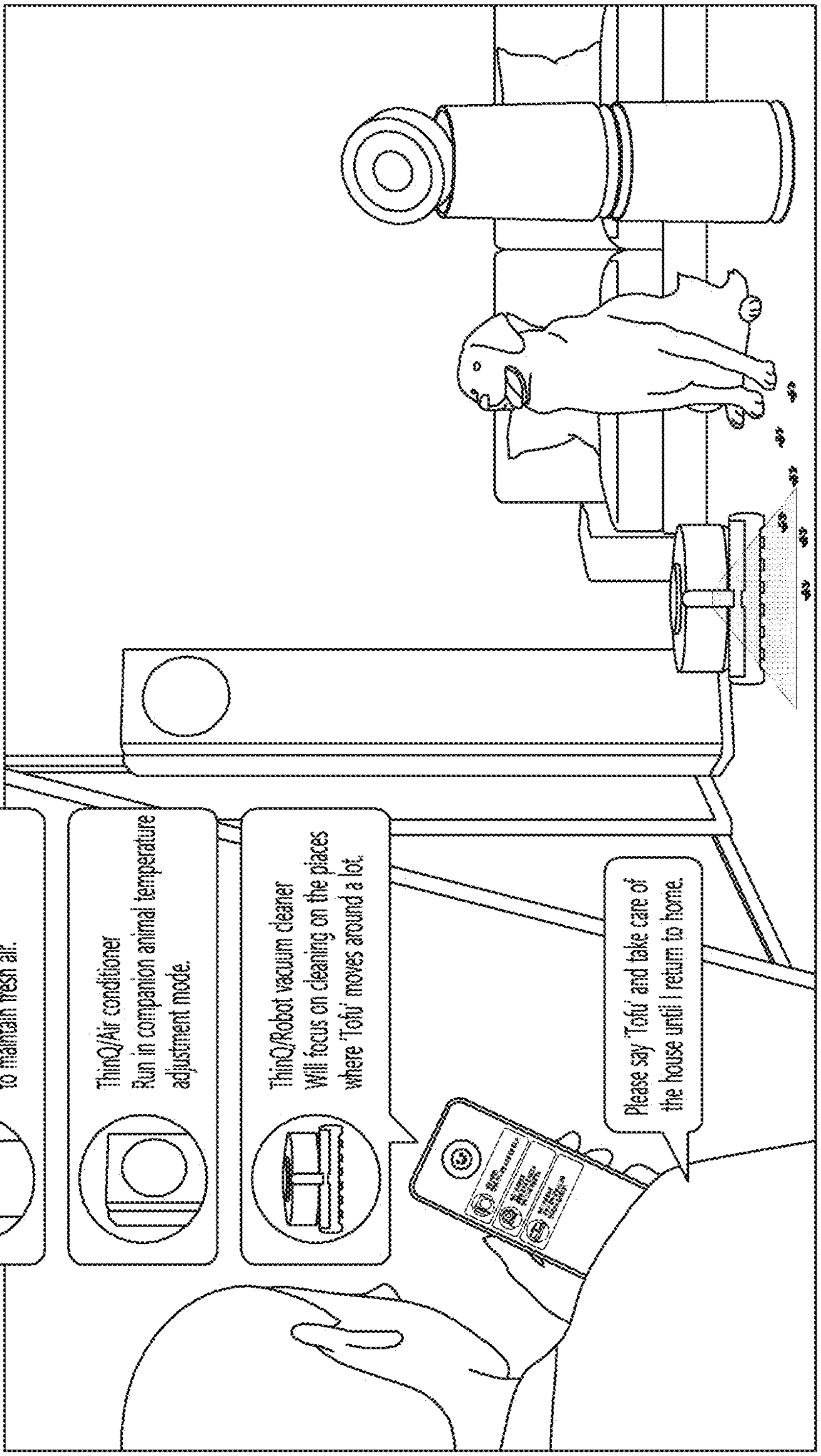
FIG. 7 is a view illustrating an interface in the information processing method according to an embodiment.

FIG. 7 is a view illustrating an interface in the information processing method according to an embodiment. Terms used in the interface in the drawings are directly quoted from the description of the embodiment for convenience of understanding. Other terms and methods with similar meaning may be used. FIG. 7 illustrates an instruction for realizing an additional mode for caring for a companion animal while going out and performing a companion animal care mode indoors or outdoors.

In FIG. 6, the outgoing may be user's schedule information. Likewise, in FIG. 7, the additional mode and companion animal mode may correspond to the user's schedule information.

Other contents are the same as the description of FIG. 6 above and the differences are explained.

First, the basic information may be voice information saying, "Please say 'Tofu' and take care of the house until I return to home." The first result reply may be "Yes, let's take a good look at 'Tofu'" corresponding to the interpreted result. The first result reply may have the meaning of the companion animal care.

An example of the third result reply is given above. The information processing apparatus may transmit the sound information "I will activate the deodorizing mode to maintain fresh air." to the terminal with respect to the air cleaner. The information processing apparatus may transmit the sound information "Run in companion animal temperature adjustment mode." to the terminal with respect to the air conditioner. Regarding the robot vacuum cleaner, the information processing apparatus may transmit the sound information, "Will focus on cleaning the places where 'Tofu' moves around a lot." to the terminal.

The third result reply may also be transmitted through the terminal as described above. Alternatively, in the third result reply, the corresponding home appliance may directly transmit the message. This is because the user informs the going out and companion animal care mode and may be inside the home. The message may be transmitted directly to the user. The message may be of various types, such as a stored voice, an alarm, and a stored message.

Hereinafter, various embodiments of information processing methods for the home appliance will be described.

Figure 8:
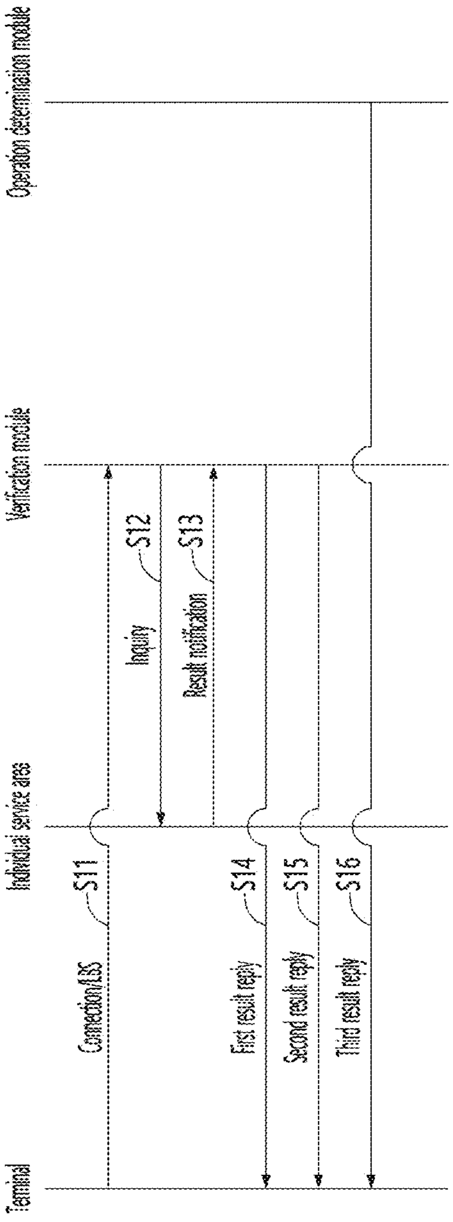
FIG. 8 is a flowchart of the information processing method for the home appliance according to an embodiment.

FIG. 8 is a flowchart of the information processing method for the home appliance according to an embodiment.

Referring to FIG. 8, a user 1*d* may transmit that he/her goes out using the terminal 1*c* (S11). The user may transmit voice.

The effect of the outgoing may be understood by at least one service of the recognition service 35, the butler service 33, or the recognition enhancement service 34 provided as the service in the individual service area 10. For example, through the recognition service 35, the meaning of the outgoing may be understood through a learning model. Thereafter, an application service may be provided. For example, the interpreted result may include the effect that the user goes out and the actions that the home appliance should take in response to the user outgoing (S12) (S13).

In response to the interpreted result, the confirmation module 20 may perform a first result reply process (S14) to confirm to the user whether the user goes out.

In response to the analyzed result, the confirmation module 20 may determine the current state of the home appliance by transmitting the control signal to the home appliance. The identified results may be delivered to the user as a second result including the state of the home appliance (S15)

In response to the analyzed result, the operation determination module 30 may determine at least one of the operation sequence, the operation mode, or the operation time of at least one home appliance. The information processing apparatus may control the home appliance using at least one of the determined operation sequence, operation mode, or operation time. The information processing apparatus may notify the terminal 1*c* of the control result of the home appliance as a third result (S16). The home appliance may directly transmit a third result reply to the user.

During the execution of the information processing method, the confirmation module and the operation determination module may use the individual service in the individual service area. The user may know the progress and results of the application service through the first, second, and third result replies.

Figure 9:
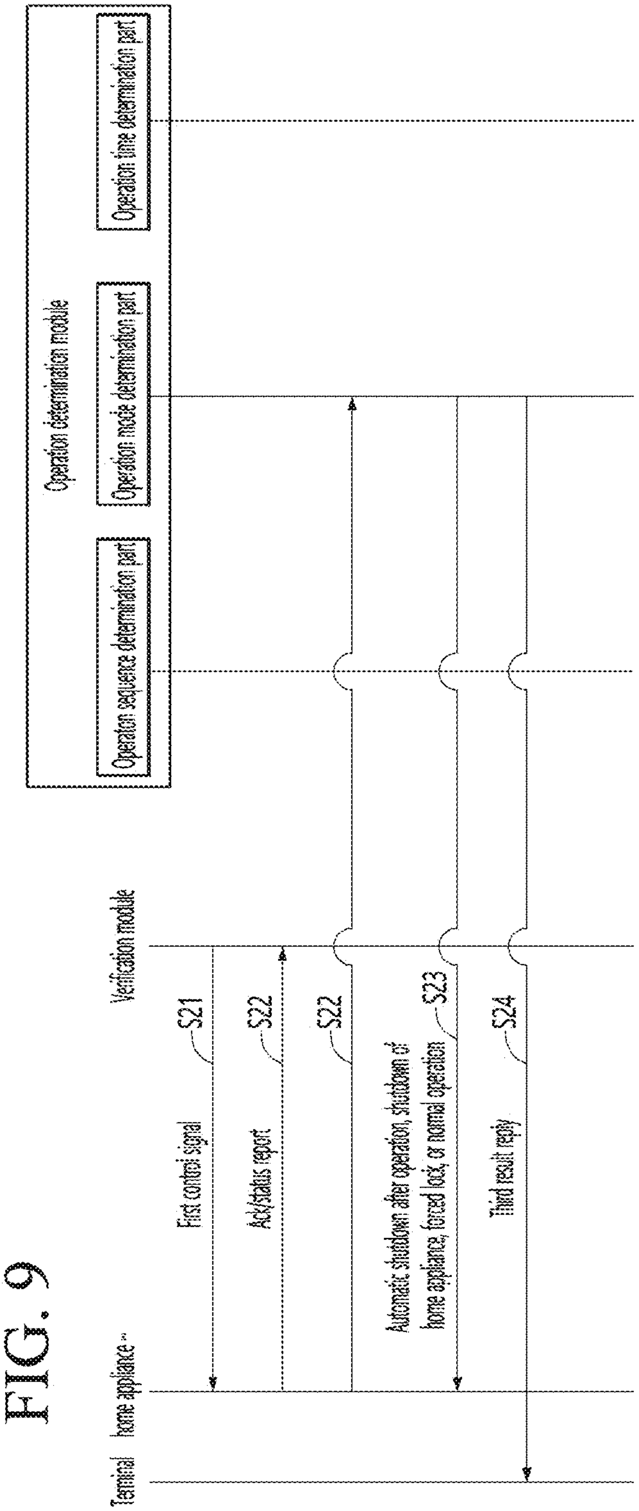
FIG. 9 is a flowchart of the information processing method for the home appliance according to an embodiment.

FIG. 9 is a flowchart of the information processing method for the home appliance according to an embodiment. This embodiment may be an embodiment after the user's intention to go out and/or take care of the companion animal is identified. For example, this may be an information processing method after the user's outgoing is identified by the information processing method of FIG. 5.

Referring to FIG. 9, the confirmation module 20 may determine the current state of the home appliance 1*b* by transmitting the first control signal to the home appliance 1*b* (S21). The home appliance may transmit an ack message and a status report message (S22). The home appliance may transmit the ack message and the status report signal to at least one of the confirmation module 20 of the operation determination module 30. Through the bus inside the information processing apparatus, each module of the information processing apparatus may share information. The ack message may be transmitted to the confirmation module. The status report message may be transmitted to the operation determination module.

The operation mode determination part 32 may receive the status report message. The operation mode determination part may determine the operation mode of the home appliance by referring to the status report message. Depending on the type of the home appliance and/or the status report message, the operation mode of the home appliance may be determined differently.

The information processing method will be explained with an example.

The home appliance, of which reservation is ended, such as washing machines, may be referred to as a first group.

In the case of the washing machine, in the status report message, the washing machine is currently in operation and may be scheduled for termination. Here, the status report message may include a message that all cycles will be ended in two hours. The status report message may be a response to the first control signal. In this case, the user may determine an automatic shutdown mode after the operation. The determined mode may be notified to the washing machine (S23), and the determined information may be reported to the user through the third result reply (S24).

Since collaboration with other home appliances is not presented in this embodiment, the operation sequence determination part and the operation time determination part may not work.

As mentioned above, the normal operation of the first group of the home appliances may be secured even when the user goes out.

The home appliances that are unrelated to safety and related to user preference, such as televisions and audio devices, may be referred to as a second group. Although the home appliances of the second group are in operation, reservation may not be terminated.

In the case of the television, in the status report message, the television is currently in operation and may not be scheduled for termination. The status report message may be a response to the first control signal. In this case, you may determine an immediate shutdown mode that terminates immediately. The determined mode may be notified via television (S23). Thus, the television may be turned off immediately. The determined matters may be reported to the user through the third result reply (S24).

Since collaboration with other home appliances is not presented in this embodiment, the operation sequence determination part and the operation time determination part may not work.

As mentioned above, the home appliances in the second group no longer require operation when the user goes out. Thus, energy may be saved by immediately turning off the home appliance.

The home appliances that pose a risk to safety in opened environments, such as an induction, a highlight, a gas range, and a water purifier, may be considered the third group. The third group includes representative heating cooking appliances.

In the case of the induction, the status report message may report that the induction is currently in operation. The third group's operation may mean that heat/hot water is provided in response to the user's needs. The status report message may be a response to the first control signal. In this case, the user may immediately determine a safe mode that sets a forced lock. The determined mode may be notified as the induction (S23). Thus, the induction may immediately enter the safe mode. Here, the safe mode may mean a mode in which operation may be prevented by the companion animal or unexpected disturbances. For example, the user may set the same function as the locking mode of the terminal. The determined matters may be reported to the user through the third result reply (S24).

Since collaboration with other home appliances is not presented in this embodiment, the operation sequence determination part and the operation time determination part may not work.

As mentioned above, the third group of the home appliances may be safely maintained in their current state when the user goes out. Thus, the safety of the home may be maintained. In the case of the water purifier, a power saving mode that eliminates the cooling function may be additionally performed. In this case, an energy load may be further reduced.

The home appliances that operate normally, such as a refrigerator, a wine cellar, and a water purifier, may be referred to as a fourth group.

In the case of the refrigerator, the status report message may report that the refrigerator is currently in operation. That the fourth group is in operating may mean that it is difficult to change immediately and that the movement has to be maintained. The status report message may be a response to the first control signal. In this case, a normal operation mode that maintains the current operation may be determined. The determined mode may be notified to the refrigerator (S23). Thus, the refrigerator may maintain its current operation. The determined matters may be reported to the user through the third result reply (S24).

Since collaboration with other home appliances is not presented in this embodiment, the operation sequence determination part and the operation time determination part may not work.

As mentioned above, the fourth group of the home appliances may operate normally even when the user goes out. The users may conveniently use the home appliances after returning home.

Through this control method for the home appliances, the user may use the home appliances more conveniently, safely, and with energy savings.

Figure 10:
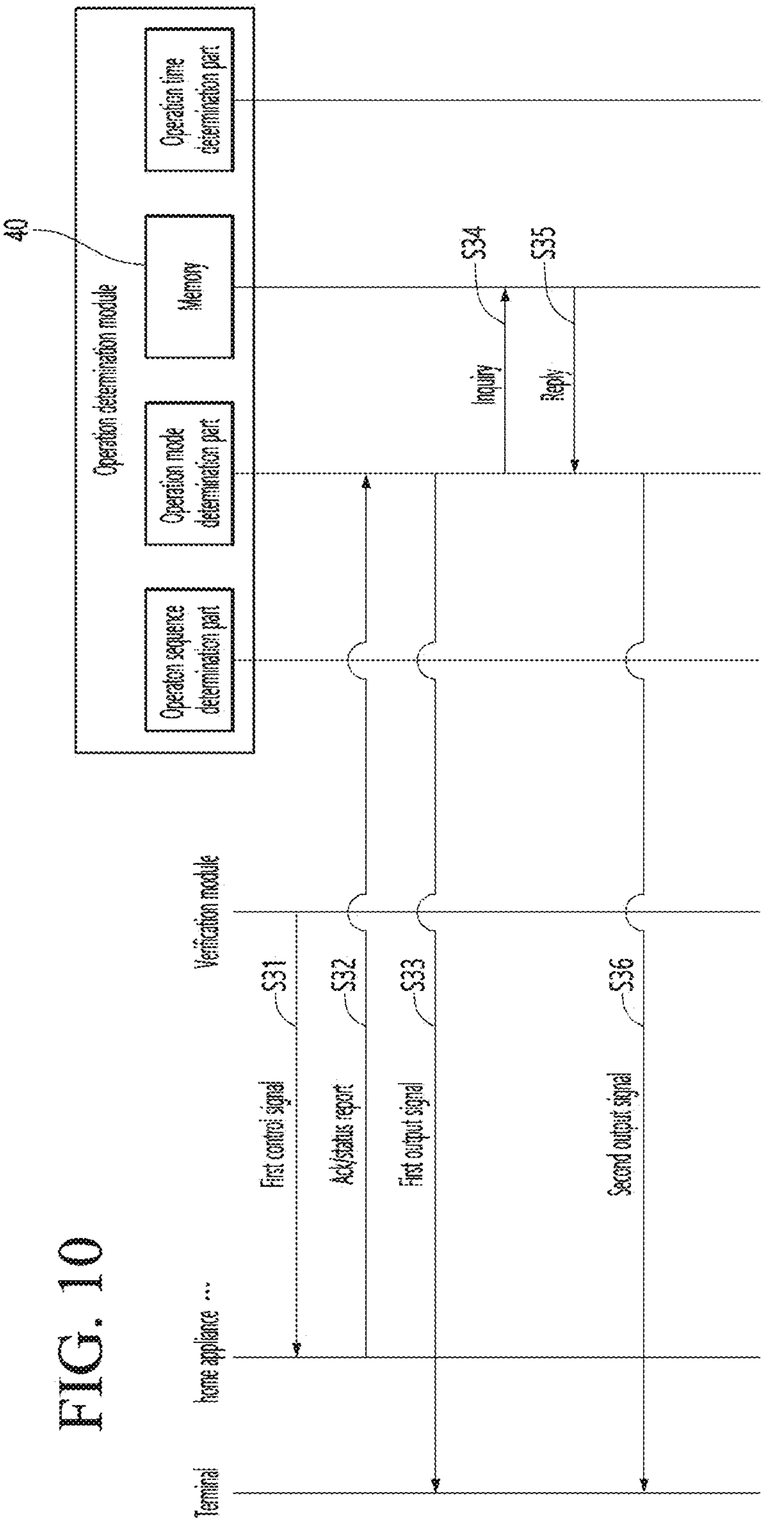
FIG. 10 is a flowchart of the information processing method for the home appliance according to an embodiment.

FIG. 10 is a flowchart of the information processing method for the home appliance according to an embodiment. This embodiment may be an embodiment after the purpose of delaying the user's outgoing is identified. For example, this may be an information processing method after the user's delayed return home is identified by the information processing method of FIG. 5.

Referring to FIG. 10, the confirmation module 20 may determine the current state of the appliance by transmitting the first control signal to the home appliance 1*b* (S31). The home appliance may transmit an ack message and a status report message (S32). The home appliance may transmit the ack message and the status report signal to at least one of the confirmation module 20 of the operation determination module 30. Through the bus inside the information processing apparatus, each module of the information processing apparatus may share information. The ack message may be transmitted to the confirmation module. The status report message may be transmitted to the operation determination module.

The operation mode determination part 32 may receive the status report message. The operation mode determination part may determine the operation mode of the home appliance by referring to the status report message.

The information processing method will be explained with an example.

The home appliances such as the light wave oven and the washing machine that have completed in washing cycle may be referred to as a fifth group.

In the case of the light wave oven, the status report message indicates that the operation has now been completed, and user action may be required. Here, the status report message may include a message that there is food that has completed cooking in the light wave oven, and that the user's needs are required. For example, the status report message may include an image of food inside the oven. Here, the light wave oven may have a built-in camera. The status report message may be a response to the first control signal. In this case, the operation mode determination part may perform a notification mode that notifies the user that there is food. The notification mode may be performed by transmitting a first output signal to the terminal (S33).

The status report message may be a message that refers to additional information of the server. For example, the server and the light wave oven may exchange information with each other to recognize door opening and closing of the light wave oven. In this case, the operation history of the light wave oven may be stored in the server 2*c*. In this case, the operation mode determination part may inquire with the memory 40 (S34) and receive a reply (S35). For example, the server may reply that the door of the light wave oven is closed after opening, and that the door is not opened again after the cooking process.

The operation mode determination part may refer to the information in the memory and reply a second output signal to the terminal (S36). The user may decide whether to perform additional work or not by looking at the first and second output signals. For example, in the case of the light wave oven, the user may determine whether to add additional treatment to cooked food or dry laundry.

Since collaboration with other home appliances is not presented in this embodiment, the operation sequence determination part and the operation time determination part may not work.

As mentioned above, the fifth group of the home appliances may be used more faithfully to their original functions by further determining whether the user's work is required even if the user goes out. Particularly, the user may conveniently use the home appliances when going out.

Figure 11:
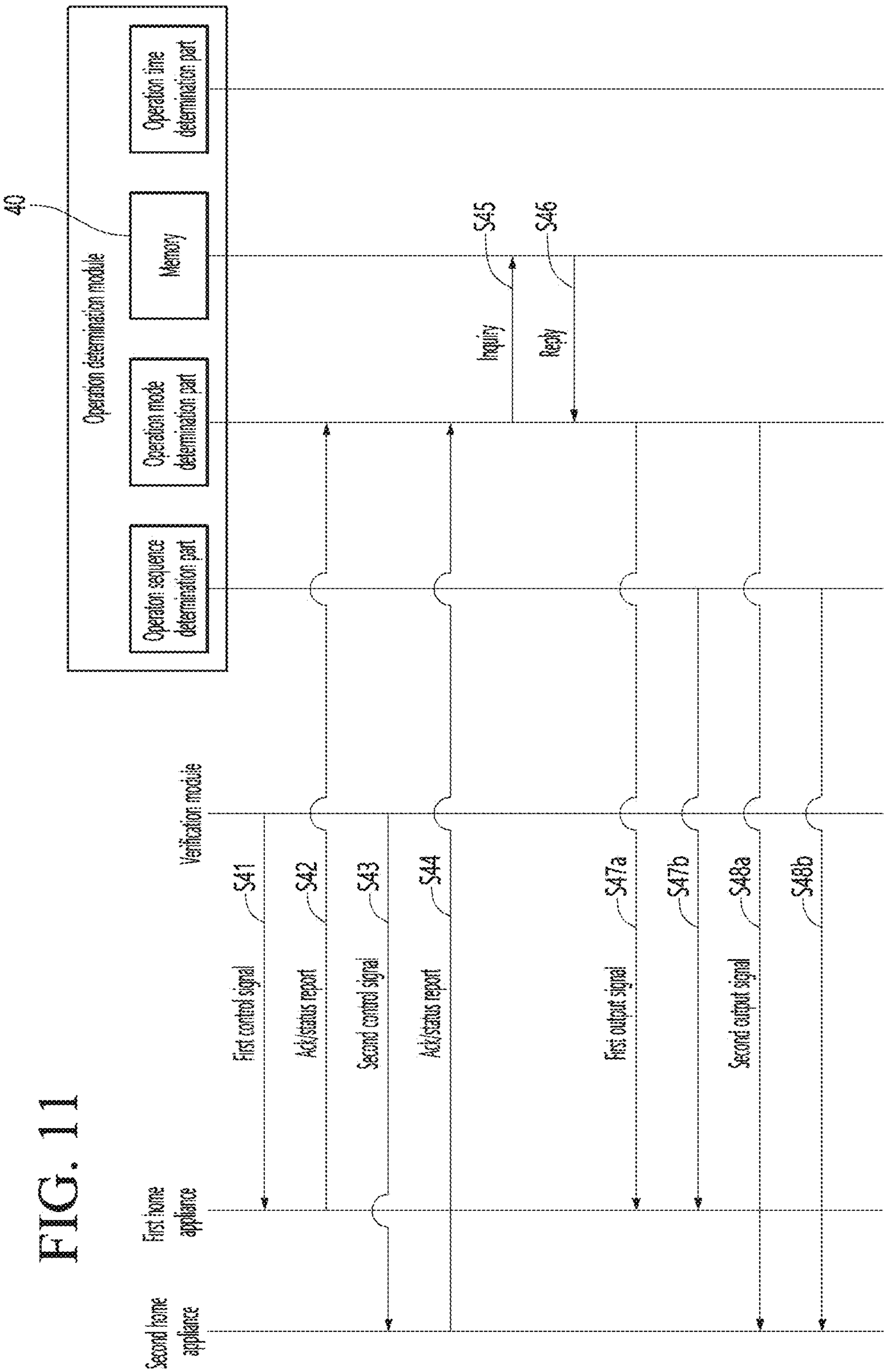
FIG. 11 is a flowchart of the information processing method for the home appliance according to an embodiment.

FIG. 11 is a flowchart of the information processing method for the home appliance according to an embodiment. This embodiment may be an embodiment after the user's companion animal mode is identified. For example, this may be an information processing method after the user's companion animal care instruction are identified by the information processing method of FIG. 5.

Referring to FIG. 11, the confirmation module 20 may determine the current state of the device by transmitting the first control signal to the first home appliance 1*b* (S41). The first home appliance may transmit an ack message and a status report message (S42). The first home appliance may transmit the ack message and the status report signal to at least one of the confirmation module 20 and the operation determination module 30. Through the bus inside the information processing apparatus, each module of the information processing apparatus may share information. The ack message may be transmitted to the operation determination module. The confirmation module 20 may determine a current state of the device by transmitting the second control signal to the second home appliance 1*b*2 (S43). The second home appliance may transmit an ack message and a status report message (S44). The status report message may be transmitted to the operation determination module.

The first and second home appliances may be different home appliances. The first and second home appliances may be home appliances that cooperate with each other. For example, the first home appliance 1*b*1 may be a camera. The first home appliance may not exclude any device that may recognize the companion animal. The second home appliance 1*b*2 may be at least one of the air conditioner, the air purifier, or the robot vacuum cleaner.

The second home appliance may be a home appliance of the sixth group and may be a home appliance for caring for the companion animal. The sixth group of the home appliances is not limited to the above exemplary home appliances. Various devices such as a ventilation device, a play device, and a feeding device for the companion animal may be included.

The status report message may be a message that refers to additional information of the server. For example, the server may store data such as the companion animal's species and age. In this case, the operation mode determination part may inquire with the memory 40 (S45) and receive a reply (S46).

The operation mode determination part may refer to the information in the memory and reply a first output signal to the first home appliance (S47*a*). The operation mode determination part may refer to the information in the memory and reply a second output signal to the second home appliance (S48*a*).

The operation mode determination part 32 may receive two status report messages. The operation mode determination part 32 may share information with the operation sequence determination part 31 and the operation time determination part 33 through an internal bus of the operation determination module. The operation sequence determination part 31 and the operation time determination part 33 may determine an operation sequence and an operation time by referring to at least one of the two status report messages or the determination mode. The operation mode determination part 32 may determine the operation mode of the home appliance by referring to the status report message. Depending on the type of the first and second home appliances and/or the status report message, the operation mode, the operation time, and the operation sequence of the first and second home appliances may be determined differently.

In the embodiment, the operation sequence determination part 31 may refer to the information in the memory and reply the first output signal to the first home appliance (S47*b*). The operation mode determination part may refer to the information in the memory and reply a second output signal to the second home appliance (S48*b*).

The information processing method will be explained with an example.

The first home appliance is the camera, and the second home appliance is the air conditioner. In this case, the camera may track the companion animal to evaluate an amount of movement of the companion animal. If the amount of movement of user's companion animal is high, the filtering capacity of the air purifier may increase. The air purifier may operate by following the information from the camera.

Here, the acquired information of the camera may be processed in the server. The server may operate the air purifier. The camera and the air purifier may be connected directly or indirectly to exchange information with each other.

Thus, an air purification capacity may be adjusted in response to the amount of behavior of the companion animal. Thus, information such as a size of the companion animal may be used as a reference.

As another example, the first home appliance is the camera, and the second home appliance is the air purifier. In this case, the camera may track the companion animal to evaluate an amount of movement of the companion animal. If the amount of movement of companion animals is high, the cooling capacity of the air conditioner may increase. The air purifier may operate by following the information from the camera.

Here, the acquired information of the camera may be processed in the server. The server may operate the air purifier. The camera and the air purifier may be connected directly or indirectly to exchange information with each other.

Thus, a temperature may be adjusted in response to the amount of behavior of the companion animal. Here, the breed and age of the dog may be evaluated together to suggest an appropriate temperature for the companion animal.

As another example, the first home appliance is the camera, and the second home appliance is the robot vacuum cleaner. In this case, the camera may track the companion animal and know an animal's movement path. The companion animal's movement trajectory may be reflected to increase in cleaning capacity of the robot vacuum cleaner on routes with a lot of movement. The robot vacuum cleaner may operate by following the information from the camera.

Here, the acquired information of the camera may be processed in the server. The server may operate the air purifier. The camera and the robot vacuum cleaner may be connected directly or indirectly to exchange information with each other.

Thus, the usage of the robot vacuum cleaner and the movement path of the robot vacuum cleaner may be controlled in response to the amount of behavior and movement trajectory of the companion animal. Here, the breed and age of the dog may be evaluated together.

Figure 12:
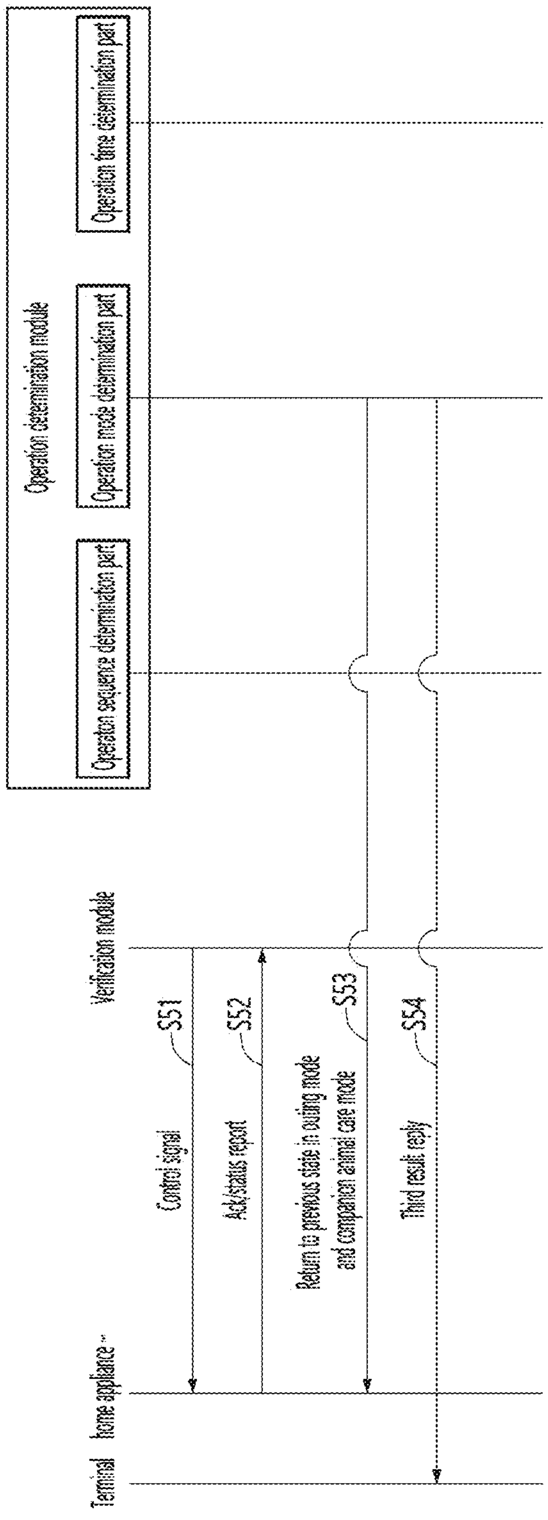
FIG. 12 is a flowchart of the information processing method for the home appliance according to an embodiment.

FIG. 12 is a flowchart of the information processing method for the home appliance according to an embodiment. This embodiment may be an embodiment when the user returns to home while performing the user's outgoing mode and companion animal mode. For example, this may be an information processing method after the user's return home is identified by the information processing method of FIG. 5. The return home may be recognized in various manners, such as the time when the user's terminal is connected to the Wi-Fi network used by the home appliance, the time when the user is in the same location as the home appliance based on LBS, the user transmitting a return home message to the terminal, the user's voice, etc. It may also be recognized using the individual service in the individual service area.

Referring to FIG. 12, the confirmation module 20 may determine the current state of the appliance by transmitting the control signal to the home appliance 1*b* (S51). The home appliance may transmit an ack message and a status report message (S52). The home appliance may transmit the ack message and the status report signal to at least one of the confirmation module 20 of the operation determination module 30. Through the bus inside the information processing apparatus, each module of the information processing apparatus may share information.

The operation mode determination part 32 may receive the status report message. The operation mode determination part may determine the current state of the home appliance by referring to the status report message. The current state of the home appliance may be returned to the previous state before performing the outgoing mode and the companion animal mode (S53). The fact of the return home may be transmitted to the user's terminal (S54).

In another embodiment, the type of return home mode may be different depending on the type of person that returns to home. For example, if the person that returns to home is a child, the home appliances of the third group may not return and but maintain the previous mode. If the person that returns to home is an adult, the home appliances in the third group above may also be returned.

Figure 13:
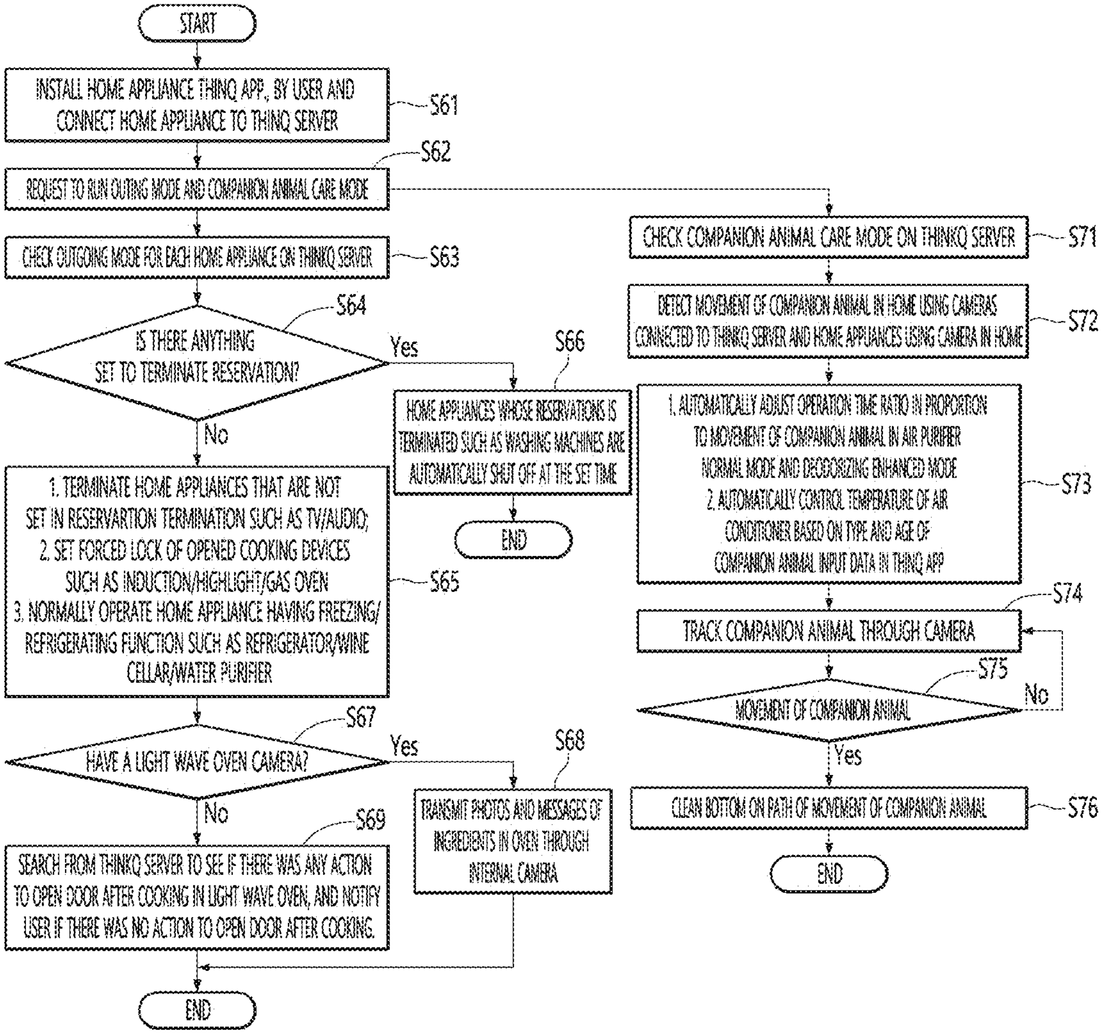
FIG. 13 is a flowchart of the information processing method for the home appliance according to an embodiment.

FIG. 13 is a flowchart of the information processing method for the home appliance according to an embodiment. In this embodiment, a view for explaining an information processing method for a plurality of home appliances is illustrated.

Referring to FIG. 13, an application program is installed on the user's home appliance, and the home appliance may be connected to a server through a network (S61). As an example, the application may be a ThinQ app. The application program may be installed by the server 2*c*.

In this state, the outgoing mode and the companion animal mode may be requested due to the user's outgoing (S62). Here, the request may use various initial information such as terminal instructions, user's voice, and user's behavior. The meaning of initial information may be understood by utilizing each individual service in the individual service area.

The application program may check at least one home appliance through the server (S63). The server may transmit predetermined control commands for the home appliances. The server may determine the leading and following operations of at least two home appliances. At least two home appliances may operate according to the control command.

Whether the home appliance has a reservation termination setting may be checked (S64). Here, it may not matter whether the operation is initiated or not. In this case, the home appliances of the first group that have a reservation shutdown setting may be controlled to automatically shut down after the operation (S66). The home appliances in the first group may operate normally even when the user goes out.

In the reservation termination setting determination process (S64), the second group without the reservation termination may be terminated (S65). For the home appliances of the second group, no further operation is required when the user goes out. Thus, energy may be saved by immediately turning off the home appliance.

In the reservation termination setting judgment process (S64), the third group that does not have a reservation termination and may threaten safety may set a forced lock (S65). Here, the forced locking refers to the home appliance not operating even if there is unintentional operation. The third group of home appliances may be safely kept in an inactive state when the user goes out.

In the reservation termination setting determination process (S64), the fourth group, which has no reservation termination and has to operate normally, may operate normally (S65). The home appliances in the fourth group may operate normally even when the user goes out. The users may conveniently use the home appliances after returning home.

When setting the outgoing mode, the user may further check the fifth group of the devices that require additional action (S67). If the home appliance of the fifth group may transmit information on its own, the information of the home appliance may be transmitted to the terminal (S68). When the fifth group of the home appliances operates with the help of the server, the information processing apparatus may transmit information about the home appliances to the terminal through the server (S69). The user may currently check the status of the fifth group of home appliances. The user may decide whether to perform additional treatment.

For example, there may be cooked food inside the light wave oven. In this case, the user may be notified of shooting information from the light wave oven's own camera or the fact that the door has been operated during cooking by the light wave oven. The transmitted information may be understood, and thus, the user may determine whether to refrigerate the cooked food and take action.

In the process of requesting the outgoing mode and the companion animal mode (S62), a request for the companion animal mode may be made (S71). The companion animal mode may be performed together with the outgoing mode or independently of the outgoing mode. Here, the request may use various initial information such as terminal instructions, user's voice, and user's behavior. The meaning of initial information may be understood by utilizing each individual service in the individual service area.

The application program may use at least one home appliance as the server. Here, at least one home appliance may include the camera. Here, at least one home appliance may include the home appliance equipped with the camera. The movement of the companion animal may be detected through the camera or the camera mounted on the home appliance (S72).

The sixth group of the home appliances may operate based on the movement of the companion animal (S73).

Explanation will be made with an example.

In the case of the air purifier, the filtering capacity of the air purifier may increase significantly to reflect the amount of movement of the companion animal. Thus, an air purification capacity may be adjusted in response to the amount of behavior of the companion animal. In the case of the air conditioner, a cooling capacity of the air conditioner may increase significantly to reflect the amount of movement of the companion animal in cases in which the amount of movement is high. Thus, a temperature may be adjusted in response to the amount of behavior of the companion animal.

As described above, the home appliances of the sixth group may determine their operation in response to the behavior patterns of the companion animal. The home appliance may operate in the determined mode.

Thereafter, the camera may track the movement of the companion animal (S74). If the companion animal may move (S75) and the movement trace are saved, a frequency of the movement trace may be analyzed. Thereafter, the robot vacuum cleaner may clean the floor at a place with the movement trace or a place with many movement traces (S76). Thus, the indoor environment may be maintained more comfortably.

According to the control method of the embodiment, each mode may be conveniently performed by simply providing the basic information such as the user's intention to go out or his/her wish to care for a companion animal. The outgoing mode and the companion animal mode may provide greater user satisfaction through the cooperation of at least two home appliances.

Figure 14:
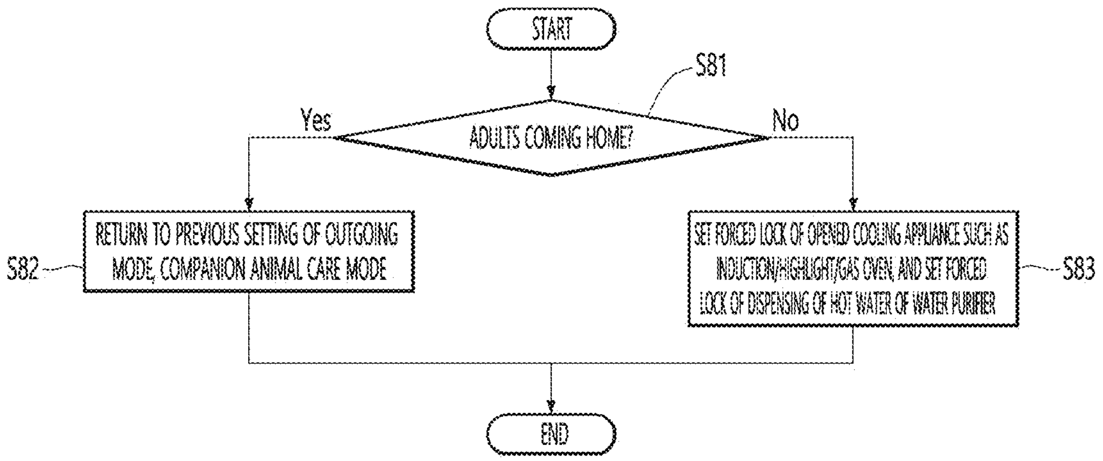
FIG. 14 is a flowchart of the information processing method for the home appliance according to an embodiment.

FIG. 14 is a flowchart of the information processing method for the home appliance according to an embodiment. This embodiment may be an embodiment after the purpose of the user's return home is identified. For example, this may be an information processing method after a trigger signal indicating the user's return home is identified by the information processing method of FIG. 5.

Referring to FIG. 14, it is determined whether the user who returns to home is an adult (S81). A variety of methods may be used to determine whether a person is an adult, including terminal identification, voice analysis, and behavior pattern analysis. Here, various methods may include each individual service in the individual service area.

If the person that returns to home is an adult, the status of all home appliances may be returned to the outgoing mode and the companion animal mode (S82). If the person returning home is a child rather than an adult, the outgoing mode and the companion animal mode may be returned to before, except for some home appliances including the third group (S83). As a result, users may be more safe.

INDUSTRIAL APPLICABILITY

According to the present invention, it is possible to activate the consumption of the remote control function of the home appliances.

The invention claimed is:

1. An information processing system for a home appliance, the information processing system comprising:

a plurality of home appliances including a first home appliance and a second home appliance, the first home appliance comprising a heating cooking appliance;

a terminal configured to process information of the plurality of home appliances;

an individual service area configured to provide an individual service; and an information processing apparatus connected to the terminal and the plurality of home appliances through a network, the information processing apparatus including at least one processor and at least one memory storing instructions executable by the at least one processor, wherein the instructions, when executed by the at least one processor, cause the information processing apparatus to provide an application service using the individual service by performing operations comprising:

receiving basic information including information indicating that a user using the plurality of home appliances is going out;

confirming, using the individual service, the user's schedule information indicating that the user is going out from the basic information;

transmitting a first control signal to the first home appliance;

receiving, from the first home appliance, an acknowledgement message and a first status report message indicating that the first home appliance is in a first state;

confirming the first state of the first home appliance based on the first status report message, wherein the first state is a state in which the heating cooking appliance is operating or is operable;

changing the first home appliance from the first state to a second state in response to the user's schedule information by transmitting a first output signal to the first home appliance, wherein the second state is a forced-lock state in which operation of the heating cooking appliance by a companion animal or an unexpected disturbance is prevented while the user is going out;

transmitting a second control signal to the second home appliance;

receiving, from the second home appliance, an acknowledgement message and a second status report message indicating a state of the second home appliance; and maintaining the second home appliance in the state indicated by the second status report message in response to the user's schedule information when the second status report message indicates that a current operation of the second home appliance is to be maintained despite the user's schedule information.

2. The information processing system according to claim 1, wherein the basic information is input from the terminal as a text input, a voice input, or a selection input indicating that the user is going out.

3. The information processing system according to claim 1, wherein the heating cooking appliance comprises at least one of an induction appliance, a highlight appliance, or a gas range, and wherein the forced-lock state is a safe mode in which a heating operation of the heating cooking appliance is prevented.

4. The information processing system according to claim 1, wherein the information processing apparatus is further configured to transmit, to the terminal, information of a third home appliance belonging to a fifth group of home appliances of the plurality of home appliances that requires additional action by the user in response to the user's schedule information.

5. The information processing system according to claim 1, wherein, at least one of the first state or the second state of at least one home appliance of the plurality of home appliances is transmitted to the terminal.

6. An information processing system for a home appliance, the information processing system comprising:

a plurality of home appliances;

a terminal configured to process information of the plurality of home appliances;

an individual service area configured to provide an individual service; and an information processing apparatus connected to the terminal and the plurality of home appliances through a network, the information processing apparatus including at least one processor and at least one memory storing instructions executable by the at least one processor, wherein the instructions, when executed by the at least one processor, cause the information processing apparatus to provide an application service using the individual service by performing operations comprising:

receiving basic information for requesting care of a companion animal from a user using the plurality of home appliances;

confirming, using the individual service, the user's schedule information indicating the user's companion animal care request from the basic information;

transmitting a first state of at least one of the plurality of home appliances;

changing of control signal to a first home appliance of the plurality of home appliances;

receiving, from the first home appliance, an acknowledgement message and a first status report message including information acquired by the first home appliance;

confirming a first state of the first home appliance based on the first status report message;

changing the first home appliance from the first state to a second state in response to the user's schedule information by transmitting a first output signal to the first home appliance, wherein the second state is a state in which the first home appliance is set to acquire information of the companion animal;

transmitting a second control signal to a second home appliance of the plurality of home appliances;

receiving, from the second home appliance, an acknowledgement message and a second status report message;

determining an operation mode of the second home appliance using at least one of the information acquired by the first home appliance, the second status report message, and companion animal information stored in the at least one memory; and controlling the second home appliance according to the determined operation mode by transmitting a second output signal to the second home appliance.

7. The information processing system according to claim 6, wherein the first home appliance comprises a camera configured to acquire photographing information of the companion animal, and wherein the second home appliance comprises at least one of an air purifier, a robot vacuum cleaner, or an air conditioner.

8. An information processing method for a home appliance, the information processing method comprising:

allowing an information processing apparatus to receive a first trigger signal indicating a user is outgoing from a node;

understanding a meaning of the first trigger signal using an individual service;

allowing the information processing apparatus to identify a first state of at least one home appliance by transmitting a first control signal to the at least one home appliance and receiving, from the at least one home appliance, an acknowledgement message and a status report message indicating the first state;

performing, corresponding to the meaning of the first trigger signal, an application service that changes an operation state of a first home appliance of the at least one home appliance from the first state to a second state; and performing, corresponding to the meaning of the first trigger signal, at least one further application service selected from:

performing an application service that maintains an operation state of a second home appliance of the at least one home appliance in the first state;

performing an application service that inquires whether or not to maintain an operation state of a third home appliance of the at least one home appliance to the user; and performing an application service that determines an operation of a fifth home appliance of the at least one home appliance by using information acquired from a fourth home appliance of the at least one home appliance, wherein the first home appliance comprises a heating cooking appliance, and wherein the second state is a forced-lock state in which operation of the heating cooking appliance by a companion animal or an unexpected disturbance is prevented while the user is going out.

9. The information processing method according to claim 8, wherein the fourth home appliance comprises a camera, and wherein the fifth home appliance comprises at least one of an air purifier, a robot vacuum cleaner, or an air conditioner that is configured to operate using photographing information from the camera.

10. The information processing method according to claim 9, wherein the camera is mounted on the fourth home appliance of the at least one home appliance.

11. The information processing method according to claim 8, wherein the fourth home appliance comprises a camera, and wherein the fifth home appliance comprises an air purifier that is configured to operate using photographing information from the camera.

12. The information processing method according to claim 9, further comprising:

receiving a second trigger signal for requesting care of the companion animal in addition to the first trigger signal; and operating at least one of the air purifier, the robot vacuum cleaner, or the air conditioner using information acquired from the camera.

13. The information processing method according to claim 12, further comprising operating at least one of the air purifier, the robot vacuum cleaner, and the air conditioner using companion animal information stored in a memory when receiving the second trigger signal.

14. The information processing method according to claim 12, wherein the robot vacuum cleaner performs cleaning along a movement trajectory of the companion animal in the acquired information.

* * * * *